United States Patent [19]

von der Heide et al.

[11] Patent Number: 5,280,222
[45] Date of Patent: Jan. 18, 1994

[54] APPARATUS AND METHOD FOR CONTROLLING BRUSHLESS ELECTRIC MOTORS AND POSITION ENCODERS AND INDICATING POSITION THEREOF

[75] Inventors: Johann von der Heide, Schramberg; Uwe Muller, Eisenbach; Micheal Hermann, Villingen-Schwenningen, all of Fed. Rep. of Germany

[73] Assignee: Papst Motoren GmbH & Co. KG, St. Georgen

[21] Appl. No.: 777,283

[22] PCT Filed: May 31, 1990

[86] PCT No.: PCT/DE90/00411

§ 371 Date: Nov. 29, 1991

§ 102(e) Date: Nov. 29, 1991

[87] PCT Pub. No.: WO90/15473

PCT Pub. Date: Dec. 13, 1990

[30] Foreign Application Priority Data

Jun. 1, 1989 [DE] Fed. Rep. of Germany ....... 3917924
Dec. 23, 1989 [DE] Fed. Rep. of Germany ....... 3942755

[51] Int. Cl.⁵ ............................................. H02P 7/00
[52] U.S. Cl. .................................. 318/138; 318/439; 318/254
[58] Field of Search ............... 318/254, 138, 439, 799–812, 511; 388/806, 815, 909, 807

[56] References Cited

U.S. PATENT DOCUMENTS

| | | | |
|---|---|---|---|
| 4,528,486 | 7/1985 | Flaig et al. | 318/254 |
| 4,531,079 | 7/1985 | Muller . | |
| 4,712,050 | 12/1987 | Nagasawa et al. | 318/254 |
| 4,743,815 | 5/1988 | Gee et al. | 318/254 |
| 4,814,677 | 3/1989 | Plunkett | 318/254 |
| 4,893,071 | 1/1990 | Miller . | |
| 4,928,043 | 5/1990 | Plunkett | 318/254 |
| 4,958,115 | 9/1990 | Miller . | |
| 5,012,166 | 4/1991 | Ushijima et al. | 318/254 |
| 5,017,845 | 5/1991 | Carobolante et al. | 318/138 |
| 5,028,852 | 7/1991 | Dunfield | 318/254 |
| 5,047,699 | 9/1991 | Rozman et al. | 318/254 |

FOREIGN PATENT DOCUMENTS 0251785 1/1988 European Pat. Off. .

OTHER PUBLICATIONS

Schroedl, M. and Stefan, T., "Algorithm for Mathematical Detection ...", Antriebssysteme fuer die Geraete- und Kraftfahrzeugtechnik, Bad Nauheim, Germany, VDE-Verlag Berlin-Offenbach, pp. 48-54 (1988).
Schroedl, M., "Detection of the Rotor Position of a Permanent Magnet Synchronous Machine at Standstill", Proc. ICEM, Pisu (Italy), pp. 195-197 (1988).
Schroedl, M., "Operation of the Permanent Magnet Synchronous Machine Without a Mechanical Sensor", Proc. IEE International Conference on Power Electronics and Variable Speed Devices, London, pp. 51-56 (1990).
P. P. Acarnley et al., "Detection of Rotor Position in Stepping and Switched Motors by Monitoring of Current Waveforms", IEEE Transaction on Industrial Electronics, vol. IE-32, No. 3, Aug. 1985, pp. 215-222.

Primary Examiner—Jonathan Wysocki
Attorney, Agent, or Firm—Finnegan, Henderson, Farabow, Garrett & Dunner

[57] ABSTRACT

A brushless direct current motor is energized by a power stage. Switches of the power stage are selectively switched by an electronic control device. In order to determine the correct commutation pattern, without using rotor position indicators such as Hall effect devices, the control device is arranged to sample the power fed to the motor. The samples, each responsive to a test signal or normal energization pulses received by the motor, in a ordered sequence define an analogue function whose parameters can be determined by mathematical analysis. The analysis applied to the samples derives the necessary commutation information and the energization signals in a rapid manner by employing a vector or complex number addition based on functions dependent on variable inductance in the operation of the motor.

29 Claims, 37 Drawing Sheets

|     | SW1 | SW2 | SW3 |
| --- | --- | --- | --- |
| SW4 |     | i4  | i5  |
| SW5 | i1  |     | i6  |
| SW6 | i2  | i3  |     |

Fig. 19B

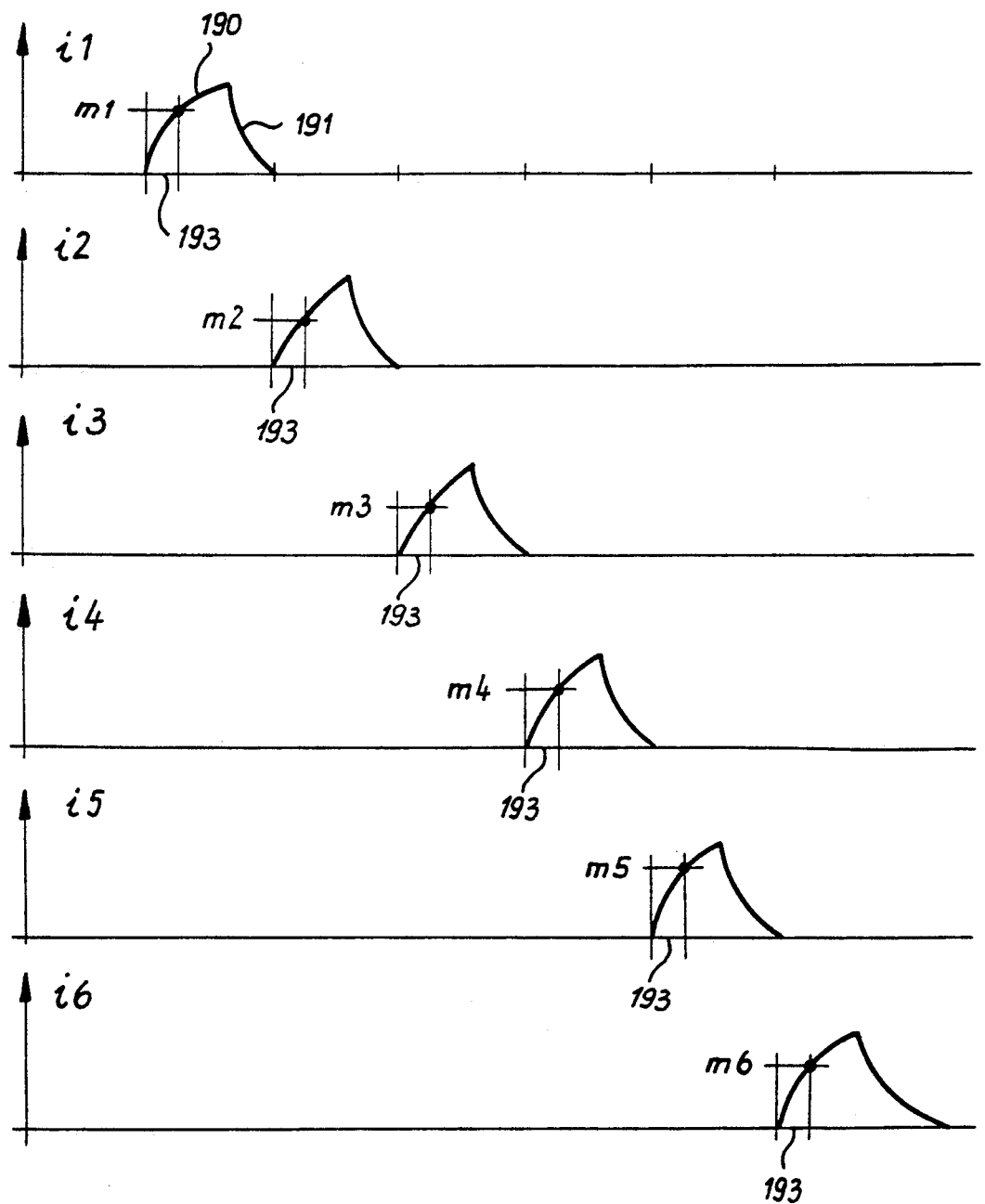

| | |
|---|---|
| Place m1, m2, m3, m4, m5 and m6 in the stack memory | S 40 |
| Set memory SUM_R to the value zero<br>Set memory SUM_I to the value zero | S 41<br>S 42 |
| Fetch m1 from stack memory<br>Add m1 to the content of memory SUM_R | S 43<br>S 44 |
| Fetch m2 from the stack memory, form (m2/2)<br>Add (m2/2) to the content of memory SUM_R<br>Ad (M2/2) √3 to the content of memory SUM_I | S 45<br>S 46<br>S 47 |
| Fetch m3 from the stack memory, form (m3/2)<br>Subtract (M3/2) from the content of memory SUM_R<br>Add (M3/2) √3 to the content of memory SUM_I | S 48<br>S 49<br>S 50 |
| Fetch m4 from the stack memory<br>Subtract m4 from the content of memory SUM_R | S 51<br>S 52 |
| Fetch m5 from the stack memory, form (m5/2)<br>Subtract (m5/2) from content of memory SUM_R<br>Subtract (m5/2) √3 from content of memory SUM_I | S 53<br>S 54<br>S 55 |
| Fetch m6 from the stack memory, form (m6/2)<br>Add (m6/2) to content of memory SUM_R<br>Subtract (m6/2) √3 from content of memory SUM_I | S 56<br>S 57<br>S 58 |
| Fetch content of memory SUM_R, square value<br>Note result in buffer store<br>Fetch content of memory SUM_I, square value<br>Add value from buffer memory to this result | S 59<br>S 60<br>S 61<br>S 62 |
| Form square root from this sum<br>Note result in memory BETRAG | S 63<br>S 64 |
| Fetch content of memory SUM_I, note sign<br>Fetch content of memory SUM_R, note sign<br>Divide value SUM_I by value SUM_R<br>Calculate angle phi via arc tan function and sign values | S 65<br>S 66<br>S 67<br>S 68 |

FIG. 21

Fig. 21A
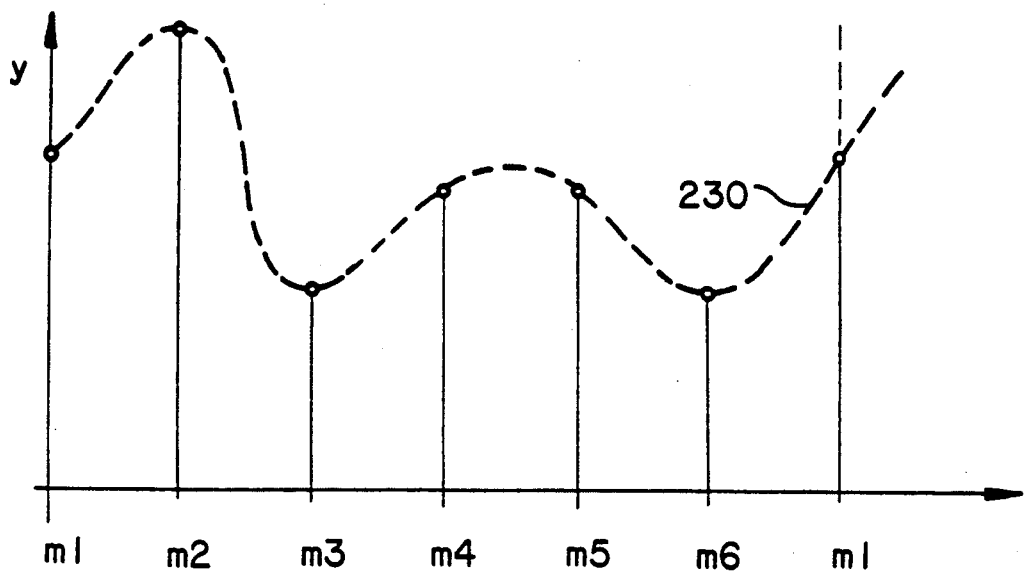
m1  m2  m3  m4  m5  m6  m1
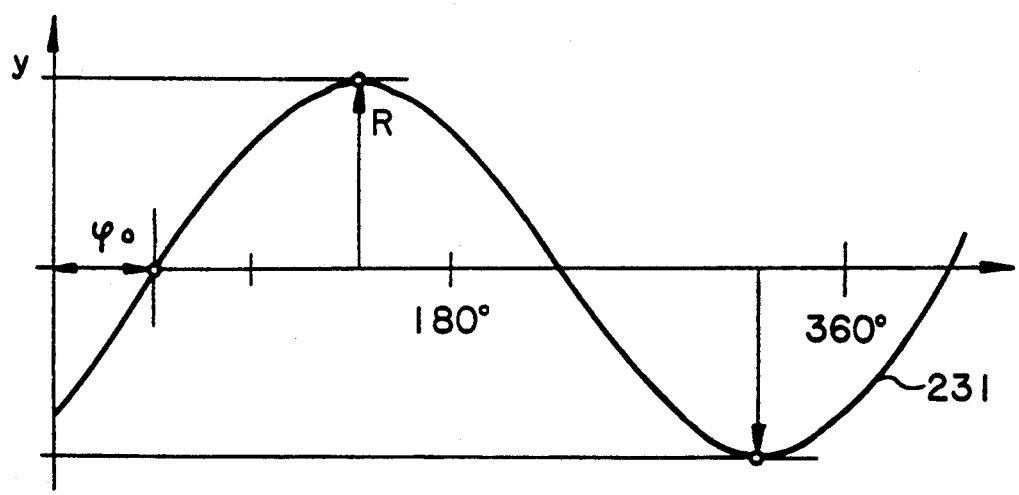
Fig. 21B

Flow Diagram:

| | | |
|---|---|---|
| Start | | S 20 |
| Fix zero time | | S 21 |
| Determine position (without external sensor) | | S 22 |
| Supply commutation signal | | S 23 |
| | Supply current to motor | S 24 |
| | Determine actual time t | S 25 |
| | Calculate current application time $T$ or determine from table | S 26 |
| | Wait for $T$ time units | S 27 |
| | Switch off motor current | S 28 |
| Up to $t > t_{LIM}$ | | S 29 |
| Supply commutation signal | | S 30 |
| | Supply current to motor | S 31 |
| | Wait for $T_o$ time units | S 32 |
| | Switch off motor current | S 33 |
| Up to stop signal | | S 34 |
| End of program | | S 35 |

FIG. 26

APPARATUS AND METHOD FOR CONTROLLING BRUSHLESS ELECTRIC MOTORS AND POSITION ENCODERS AND INDICATING POSITION THEREOF

CROSS-REFERENCE TO RELATED APPLICATION

The invention of this application is related to that of our copending patent application Ser. No. 07/805,154, filed Dec. 11, 1991.

BACKGROUND OF THE INVENTION

1. Field of the Invention

The invention relates to a motor or a position indicator (position sensor) comprising an apparatus or method for controlling a brushless electric motor. The term motor is here understood to mean also e.g. a linear motor, whose position is to be detected. Both a rotary motor and a linear motor has as its movable part a rotor.

2. Description of the Related Art

Different types of position sensors are known and are e.g. used for determining the position of motor elements. In most cases there is an associated linear acting principle for a rotary acting principle. The most important classes of such position sensors or indicators are based on the following:

Position sensors with direct contact with the movable element:
  a) Mechanical contacts.

Position sensors with contactless operating means:
  a) optoelectric position sensors: light barriers, differential photosensors, optical interference sensors
  b) magnetoelectronic (galvanomagnetic) position sensors: Hall effect sensors (based on Hall generators), Wiegand effect sensors, magnetostrictive sensors, magnetoresistive sensors
  c) electromagnetic position sensors: resolvers, eddy current sensors, differential transformers
  d) electrical position sensors: capacitively acting position sensors, microwave distance measuring equipment.

This list only represents the most important classes and only constitutes a small selection of the sensors used in practice for rotary or linear measuring functions. Hereinafter the position determination or detection processes are described to the extent that they are used both in linear or rotary acting electric motors.

Reference is subsequently made to the electrical angular position. The latter is measured in electrical degrees, e.g. 20° el. In the case of a bipolar motor with a number of poles $p=1$, the electrical degrees of the rotor position correspond to the mechanical degrees. In the case of a four pole motor ($p=2$), on rotating by 360° mech, the rotor passes through in all $p \times 360°$ el, i.e. 720° el, etc.

The described measuring methods agree within a range of 360° el, i.e. they determine the electrical angular position of the rotor. For example, with a four-pole motor ($p=2$), the measured electrical angular position 90° el represents a rotor position of 90° el or $(90+360)°$ el, which is unimportant for the commutation control.

Besides methods, which carry out a position determination in motors through external sensors (e.g. using Hall effect sensors, light barriers and magnetoresistive sensors), there are methods whose function is to determine the position of a motor by components within the motor. These methods can essentially be subdivided into two classes.

In a first class use is made of the generator characteristics of motor coils and there is a dynamic position determination. As a function of the level or integral of the generated voltage over time, conclusions can be drawn regarding the rotor position.

This class is characterized by different use fields and widely varying embodiments. As an example of the relevant prior art reference is made to the following patent literature:

U.S. Pat. No. 4,495,450
EP-B 0171635
DE-OS 27 52 880
DE-PS 30 13 550
EP-A 0316077

It is unimportant whether the magnetic field of the rotor is generated by permanent magnets or by electric magnets. To the extent that reference is made here and hereinafter to permanent magnets, it always includes electric magnets, unless indicated otherwise.

In the same way it is possible to functionally interchange rotating and stationary parts of the electric motor, i.e. the invention is suitable for internal rotor-type motors, external rotor-type motors, motors with a planar air gap, motors in which the permanent magnetic rotor rotates and the motor winding is stationary or conversely motors in which the motor winding rotates and is e.g. supplied across slip rings and the permanent magnetic part is stationary and other motor construction types, in the manner illustrated by examples hereinafter.

In a second class the position determination methods are based on the fact that the motors in question are not ideal, i.e. despite constant, distinct electrical quantities, there are normally variable positional and angular dependencies of the mechanical quantities.

Thus, in this case interest is attached to those physical effects, which are based on the position-dependent change of electrical or electromagnetic parameters of the motor and which can be established by checking with electrical means only. Such a check or measurement of interesting parameters can e.g. be performed in that one or more suitable additional measuring coils are fitted at one or more points within the motor. As two-terminal networks, the coils have complex resistors, which are characterized by ohmic resistances and inductance values and said complex resistors are normally also frequency-dependent.

When choosing a suitable fitting point within the motor one or more of the indicated quantities are dependent on the position taken up by the rotor in the case of linear and rotary motors.

Thus, e.g. by the very precise determination of the inductance of the measuring coils, conclusions can be drawn concerning the rotor position, at least with respect to the angular position, as explained hereinbefore. It is disadvantageous that in place of an externally fitted sensor, there must be a sensor in the form of at least one additional measuring coil within the motor.

If there are several such measuring coils, then apart from the complex input resistance and complex output resistance, additionally the coupling ratio of two coils can be used as a measured quantity. There are then several possibilities for measuring the position-dependent quantities in combination. It is also possible to use different frequencies or frequency mixtures.

A method of this type is e.g. described in German patent 26 16 552. It is advantageous that the inductances of the coils can be such that without difficulty higher frequency test signals can be used.

In a technically improved procedure no additional fitting of measurement coils takes place within the motor. Instead of this concomitant use is made of the inductance values of the inductances of the motor, i.e. the strands (phases) or coils of the motor for the measurement process to be performed.

As no additional constructional expenditure apart from the necessary sensor electronics is required in the last-mentioned sensor class, all the members of this class have the advantage of potentially high cost advantages, whilst simultaneously improving the reliability of the motor.

Examples of such arrangements are disclosed by EP-A-251785 and EP-A-171635. In the arrangement according to EP-A-251785 essentially only the additional power stages are required for controlling the motor phases, as well as special components as electronics for controlling the motor. However, the circuit suffers from the disadvantage that a range of 360° el to be measured is split up into two undistinguishable ranges of in each case 180° el. This is due to the fact that symmetrically to the angle of 0° el or 180° el, in the following range of 180° to 360° el there are equally large function values, i.e. it is impossible to know whether a basic value of 0° or 180° el must be added to the calculated rotor position (FIG. 22A). Moreover the precision of the position determination is limited to approximately ±60° el.

An arrangement and a method for obviating this problem are described in a work by Watanabe, Isii and Fugi (IECON 87, pp 228–234), whose solution is based on the fact that depending on the pole position of the permanent magnets of the rotor an individual stator coil through the permanent magnetic premagnetization has a current passed through it either more rapidly, or more slowly in the case of a reverse pole position or current application direction.

This is based on the non-linear magnetization characteristic of the participating soft magnetic coil cause or the magnetic circuit and the resulting inductance change of the coil through which current flows. This circuit gives a rotor position determination within a range of 360° el without ambiguity.

However, here again the position determination precision is not adequate and the typically attainable precision is limited to ±15° el. However, this precision is sufficient in order to be able to rotate an appropriate motor in planned manner. Above a certain angular speed the voltages induced in the coils are so high, that they can be used for the "dynamic" determination of the commutation times and an acceleration to higher angular speeds is possible. This speed-controlled interchange between dynamic and static position detection is also described in EP-A-251785 and the aforementioned article by Watanabe, Isii and Fuji.

Under suitable conditions, through position-dependent variation of the coil inductances, it is also possible to use the transformer coupling ratio between two coils for determining the position of the rotor. Apart from the amplitude behaviour analysis, a time behaviour analysis can be carried out. The latter method is described in Japanese patent 60-207489 and by Ishii and Watanabe, Mem. Fac. Eng., Osaka City University, vol. 26, pp 57–65, 1985.

For their performance, all the aforementioned methods normally require the use of comprehensive electronic aids.

Methods of this type are in particular used in commutatorless direct current electric motors. As a result of their simple construction and the resulting advantages concerning reliability and efficiency, they are subject to wide-spread use. Essential components of such commutatorless motors are magnets, coils (with or without an iron core), position sensors and control and power electronics. For controlling such motors, use is normally made of galvano-magnetically acting position sensors, e.g. Hall generators and the working magnets of the motor, i.e. its rotor magnets are used as the controlling magnets for said position sensors. However, in such cases the reliability is limited by that of the sensor components, their feedline and by the operating temperature of the sensors and the control magnets.

It is therefore advantageous for improving the reliability of such devices to make no use of external position sensors. In order to carry out a position determination with the components of the motor, it is consequently necessary to concomitantly use as sensor elements belonging to the system, the motor coils—in parallel to their function of driving the motor. A simultaneously obtained advantage is that through the omission of external sensor elements, e.g. the Hall generators, it is possible to save space and consequently smaller structures are obtained. For the operation of the motor without external position sensors, the motor is appropriately alternately brought into the state of a sensor, the state of a motor (actuator), the state of a sensor, etc.

However, it is relatively difficult to detect the position when the motor is stopped. The difficulties more particularly consist of generating sufficiently precise position information within the shortest measurement time and signal processing time from a minimum of measurement information. In a simple case it is sufficient to fix with a reduced precision only the commutation times necessary for changing the current application conditions for the motor. As a function of the motor operation requirements, it may be sufficient to determine the rotor position with an accuracy of approximately ±10°. However, in other cases it is e.g. necessary for motor regulating or control purposes to obtain extremely accurate measured values in a very short measurement time, so that a desired speed correction or position check is obtained. This sets increased demands on the power of the associated electronics and software used. Another difficulty in the known methods is to exclude type-typical phase errors of ±180° el in the case of a rotor position determination. Such errors mean that if the rotor is further rotated by 180°, 360° el, etc., the typical position information remains largely unchanged compared with the original position.

SUMMARY OF THE INVENTION

Therefore a problem of the invention is to provide accurate, inexpensive and insensitive sensors for rotary and linear movements. Another problem of the invention is to ensure reliable motor operation through reliable commutation processes. Another problem of the invention is to bring about a certain starting direction of such motors.

These problems are solved according to the invention by the measures given in claim 1 and the following claims. The invention makes it possible to increase the usable speed range compared with the prior art. According to the invention using microelectronics means and the relevant software, it is possible to obtain an improved accuracy and reduce the relative errors during position determination.

BRIEF DESCRIPTION OF THE DRAWINGS

The invention is described in greater detail hereinafter relative to non-limitative embodiments and the attached drawings, wherein show:

in FIG. 9).

FIG. 21 A flow diagram for phase and amplitude determination of the first harmonic of a function determined by six interpolation nodes.

FIG. 21A The approximate and periodically continued curve pattern by six interpolation nodes m1 and m6 and the phase position of the associated first harmonic.

FIG. 26 A flow diagram showing the sequence of the measurement of the rotor position alternating with the current application for a motor.

DESCRIPTION OF THE PREFERRED EMBODIMENTS

The inventive idea of solving the set problem comprises the following parts.
a) A microprocessor is used. The novel current application necessary for measurement purposes is controlled by the microprocessor.
b) The measurement and novel evaluation of the measured values is also controlled by the microprocessor with associated interface circuits.

Figure 1:
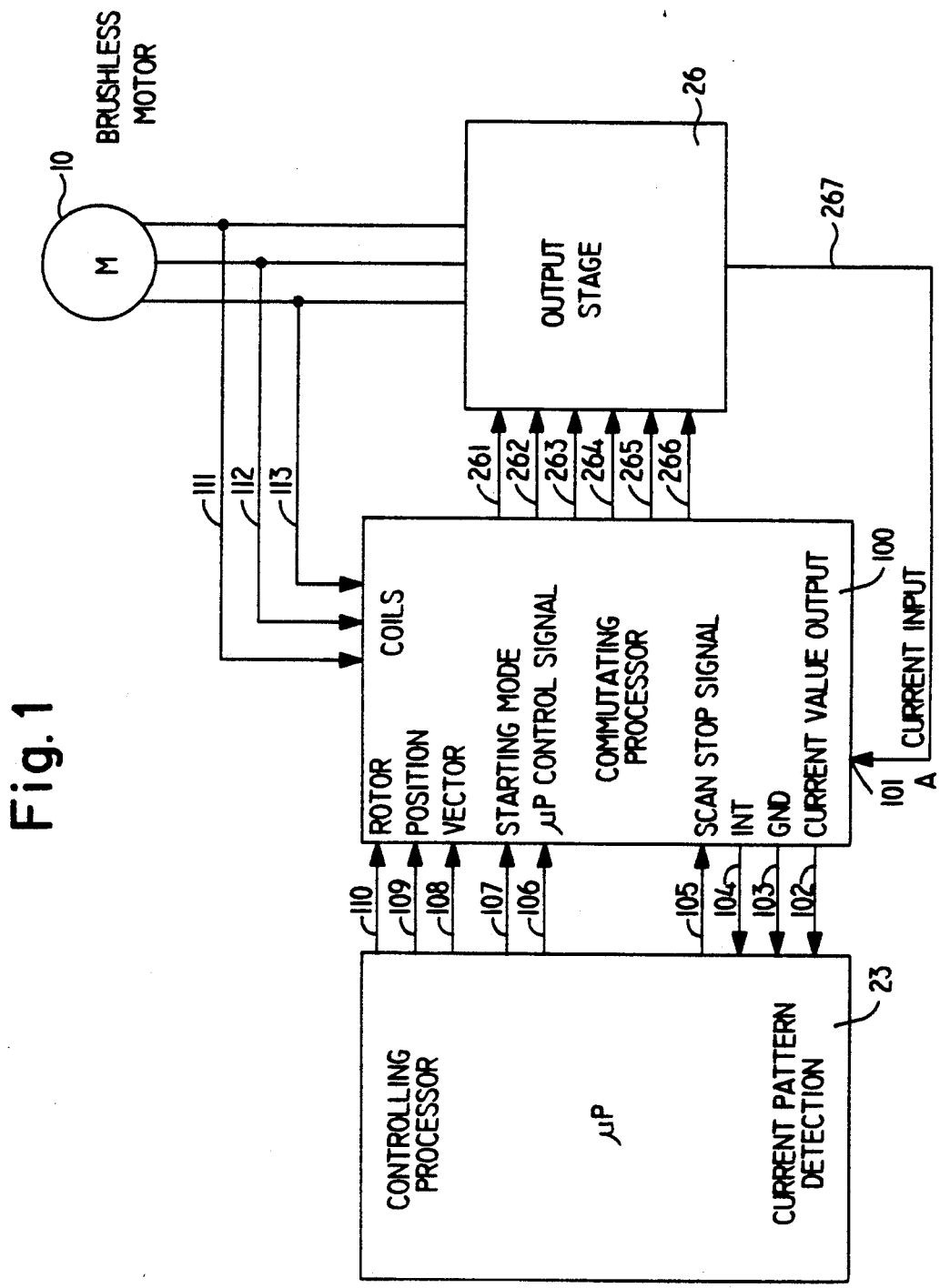
FIG. 1 The basic structure of the control electronics for a motor.

It must be borne in mind that cost-favourable microprocessors only have a low calculating speed and cannot normally match the problem to be solved. According to the invention for solving the specific problem the control and measurement processes to be performed can at least proportionally be processed by a special additional processor. The basic structure of such an inventive apparatus is shown in FIG. 1. Apart from the actual motor 10, it comprises an associated current application and output stage unit 26, a commutating processor 100 and the controlling or regulating microprocessor 23. Hereinafter the term processor is used instead of microprocessor. As shown in FIG. 1, the motor 10 can e.g. be a three-phase, commutatorless, d.c. motor. However, the invention is not restricted to such motors and, as shown in subsequent drawings, can also be advantageously used with other motor constructions. If necessary, the invention also covers completely renouncing motor operation and the use of the motor exclusively in sensor operation for determining positions. That is, the motor is operated at essentially no load as a position indicator.

The output stage unit 26 essentially comprises a switching unit for supplying current to the individual motor phases.

It is approximately constructed in conventional technology as an arrangement of e.g. three transistor half-bridges. Such circuits are e.g. known from DE-OS 31 06 856. Other embodiments, e.g. with thyristor elements or SCR elements are also conceivable. The output stage unit 26 has several control inputs (261 to 266) for operating the not shown, electronic switches contained therein. These switches supply the motor with current 10 via the individual phases in accordance with the signal combination of the switch inputs 261 to 266.

Figure 2:
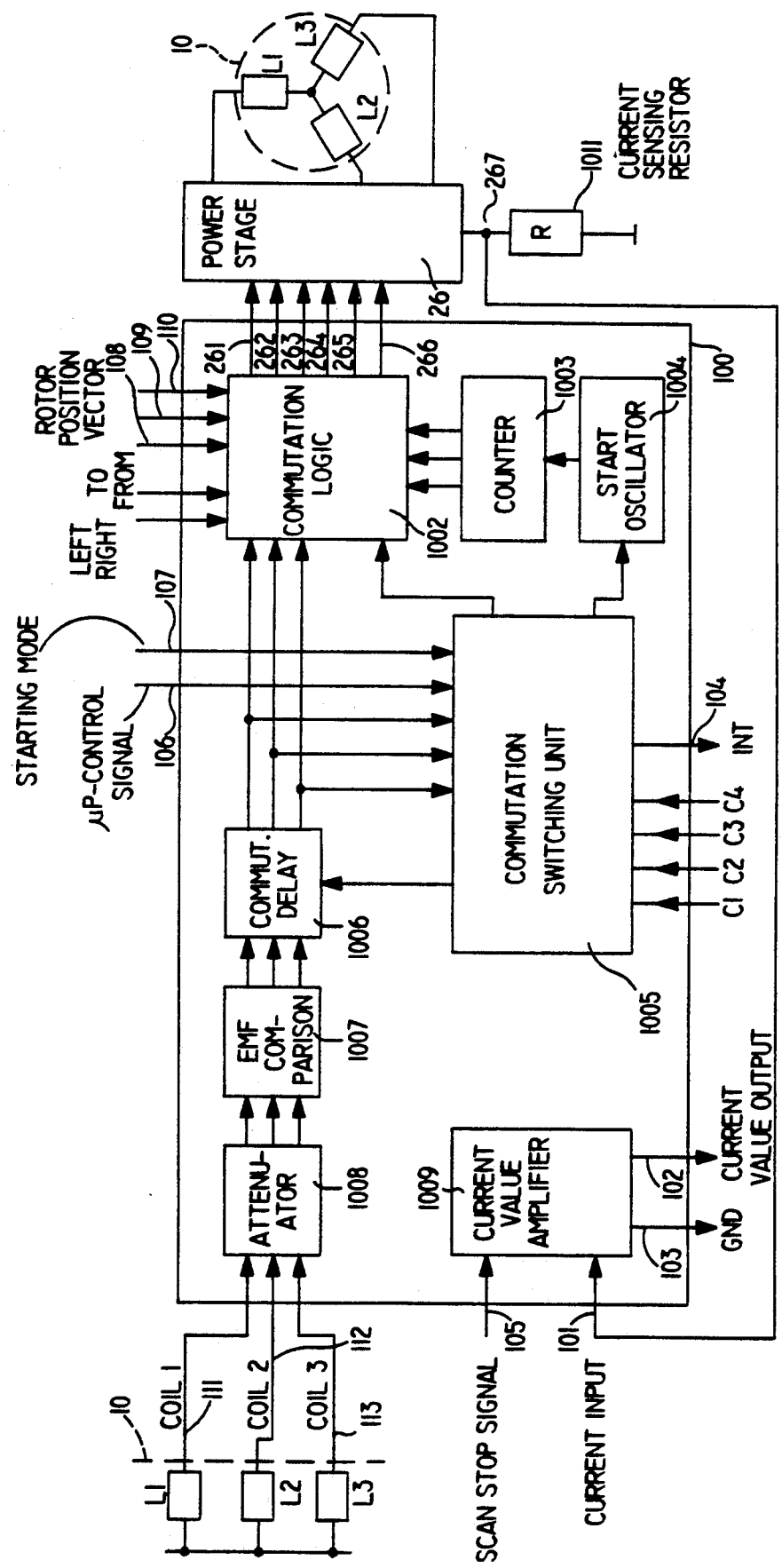
FIG. 2 The basic structure of a commutating processor.

The resulting total motor current is measured by means of a random current sensor, e.g. the position resistor 1011 in FIG. 2 and via the current sensor output 267 is supplied as a measurement signal to the input 101 of the commutating processor 100.

Other elements, which are not shown in the drawings, can e.g. comprise a regulating or control unit, which ensures that a predetermined current intensity of a predetermined level is applied to the individual phases of the motor 10, e.g. by using conventional, linearly acting controller stages. However, it is also possible to use conventional switching controllers for this purpose.

The function of the commutating processor 100 is to accept current sensor signals 267 and voltage signals 111, 112 and 113 of the three motor phases L1, L2, L3 (FIG. 2) and to calculate commutating signals therefrom. In addition, the commutating processor 100 has analog and digital control and communication connections 102 to 110 to the controlling processor 23. The commutating processor 100 can alone ensure a correct operation of the motor 10, i.e. without the microprocessor 23, but in interplay with the output stage unit 26.

It is also possible in a processor-controlled operation to carry out planned movement sequences of the motor or, whilst renouncing motor operation, to only carry out a position detection. For this purpose the interplay of processor 23, commutating processor 100 and output stage unit 26 is necessary. By means of the sample and hold signal line 105, one function of the processor 23 is to establish times at which current sensor signals 267 are to be determined, said signals being supplied to the processor 23 across the current line 102. If necessary, the commutating processor 100 can also require the microprocessor 23 across a line 104 to accept a measured current value or perform other processor activities. The essential function of the processor 23 is to calculate the correct position of the rotor of the motor 10 with the aid of current sensor data obtained in this way. The thus calculated data can be displayed e.g. on a display, but can also be supplied for further processing to a controlling computer system. This positional information can be supplied across the position lines 108 to 110 to the commutating processor 100, which in turn can carry out a correct commutation of the motor 10 on the basis of this information.

As can be gathered from FIG. 2, the commutating processor 100 essentially comprises the following unit. The central component of the commutating processor 100 is the commutating logic 1002, which calculates from external, predetermined position information fed in via the line 108-110, or from coil voltages, which are to be measured via lines 111 to 113, firstly the commutating time, i.e. the first time at which a commutation of the motor currents is to take place. For this purpose a commutating switching signal or control signal is generated, which is supplied via the signal line 261 to 266 to the output stage unit 26. In place of the direct transmission of switching signals, such signals can naturally also be transmitted in coded form.

The commutating logic 1002 is also influenced by a commutating control unit 1005, which can react to different external signals. Such signals can e.g. be the start mode signal 107 or the microprocessor presence signal 106. Exception signals C1 to C4 can also influence the control unit 1005, which is also influenced by signal voltages, which can be derived from the coil voltages of the motor 10 applied to inputs 111 to 113.

For evaluating such coil voltages, it is either possible to use coil voltages from on-load operation or coil voltages from the current-applied or energized operation can be investigated. For this purpose an attenuator 1008 is provided, together with a voltage comparison unit 1007 and a signal delay unit 1006.

Thus, the signals from phases L1 to L3 firstly reach the attenuator 108, pass from there to the voltage comparison unit 1007 and finally from there to the signal delay unit 1006, where they are passed on to the commutating logic 1002 and the commutating control unit 1005. Thus, on reaching a sufficiently high induced voltage (emf) in the phases L1 to L3, switching takes place to commutation by the induced voltage.

Another device of the commutating processor 100 is the current detection unit 1009, whose function is to detect, amplify and prepare the current sensor signals 267. This takes place in that at given times the current sensor signals 267 are amplified and stored. In this way rapidly varying current sequences can, so-to-speak, be frozen and supplied to the microprocessor 23 across the current output and the current signal line 102 for further processing. The processor 23 then has sufficient time to evaluate these current signals, because the stored signals do not initially change further. In addition to the internal switching means, the commutating processor 100 normally has external switching means, such as resistors and capacitors, which are not shown in FIGS. 1 and 2.

Further details of the commutating processor 100 are a starting oscillator 1004 and a counter 1003 for the random production of preset times or preset commutating patterns. The actual function of the commutating processor 100, without the associated microprocessor 23, is, as stated, the evaluation of the induced voltages (emf) at the motor phases L1 to L3, such as are generated e.g. under no-load conditions.

However, this operation is only practicable, if the motor rotor is already moving. Even a position measurement process using these signals requires a moving rotor for correct operation using them.

In the case of a motor stoppage, either an unidirectional starting movement is to be initiated, or by means of a special current application to the motor phases L1 to L3 and measurement of the individual phase currents, the necessary measurement information must be obtained. The investigation of the path of the phase currents can vary widely and the simplest possibility consists of evaluating the time pattern of the motor sum current.

It can also be advantageous according to the invention to carry out a current application for several stator phases for measurement purposes and to record the current intensities at different times. As a function of the intensity of the processors used for this purpose, i.e. the microprocessor 23 and/or the commutating processor 100, either only one or more current values at specific times and in particular current maxima are recorded, or times associated with clearly defined current thresholds are recorded, or one or more current paths are recorded on a time and intensity basis by means of several measurement points in each case. The thus recorded values constitute implicit numerical values for the sought and rotor position-dependent inductances or mutually inductances of the motor phases. Under appropriate conditions these can be numeral values for transformer coupling ratios.

Figure 3:
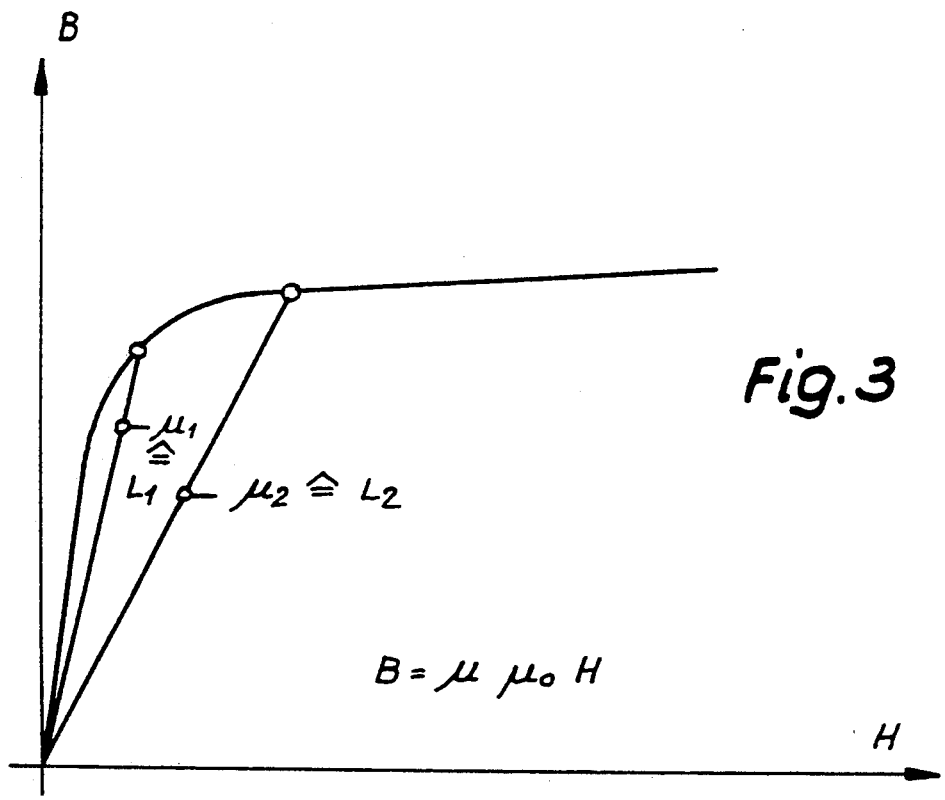
FIG. 3 The non-linear behaviour for ferromagnetic core materials for coils and relative permeabilities/inductances.

As shown in FIG. 3, a position information obtention by appropriate current application to stator phases is brought about in that through a current application of differing levels the iron components of a magnetic circuit belonging to the coils of this phase are brought close to or at saturation. Thus, there is a change to the overall inductance of a participating coil, because according to the coil formula $L=n^2\mu\,\mu_o F/d$ under otherwise constant conditions generally only the $\mu$ changes and consequently any change to the relative permeability leads to a proportional change to the inductance L. As is the case with iron, the non-linear connection between the field strength H and magnetic flux density (induction) B can be used for establishing current-dependent, effective inductances of the participating stator coils.

However, the inductance of these stator coils is not only influenced by the coil current level, but also by the polarity of the permanent magnet of a rotor, said permanent magnets facing the stator coils. This is due to the fact that through the permanent magnets, there is a premagnetization of the coil cores, so that as a function of the polarity of the coil current there is a saturation of the coil core either faster or slower than in the neutral case, i.e. without permanent magnetic premagnetization. In the case of a conventional design of magnetic circuits of motors of a general type an attempt is generally made to keep the magnetic flux density in the iron parts well below saturation, so as to keep the stray flux components low. As the change to the stator coil inductances caused by nominal current application and moving the rotor is normally only a few percent, it is important for troublefree measurement data determination for position detection purposes to use additional measures to bring about a maximum change to the inductance over a motor movement range of 360° el.

For this purpose it is e.g. possible to modify the motor magnetic circuit. An optimization with a view to a large variation of the coil inductances as a function of the rotor position can possibly lead to a reduction of the maximum motor efficiency.

Thus, according to the invention it is advantageous to apply current to several and not a single coil. It is also advantageous to apply a relatively high current compared with normal motor energization and for a short time, i.e. a few dozen microseconds (e.g. 10 to 2000 microseconds).

Correspondingly it is advantageous according to the invention to apply current to a combination of coils in a way not normally used for drive purposes. If such a current application is time-limited, then there is no need to fear significant motor efficiency losses in motor operation.

For example, in an embodiment of the invention it is possible to proceed in such a way that two stator coils of a three-phase motor are briefly supplied with a very high current and intermediately the third stator coil is supplied with a high, short current pulse. The current-time information obtained in this way normally yields more than comparable information obtained with conventional means and prior art methods.

In order to obtain the indicated differences in the inductance, as stated hereinbefore, it is useful to supply current to some of the coils present in such a way that their ferromagnetic cores are close to or at saturation. An additional premagnetization by permanent magnets within the magnetic circuit or circuits can, as stated, by helpful, but is not a prerequisite.

Figure 22A:
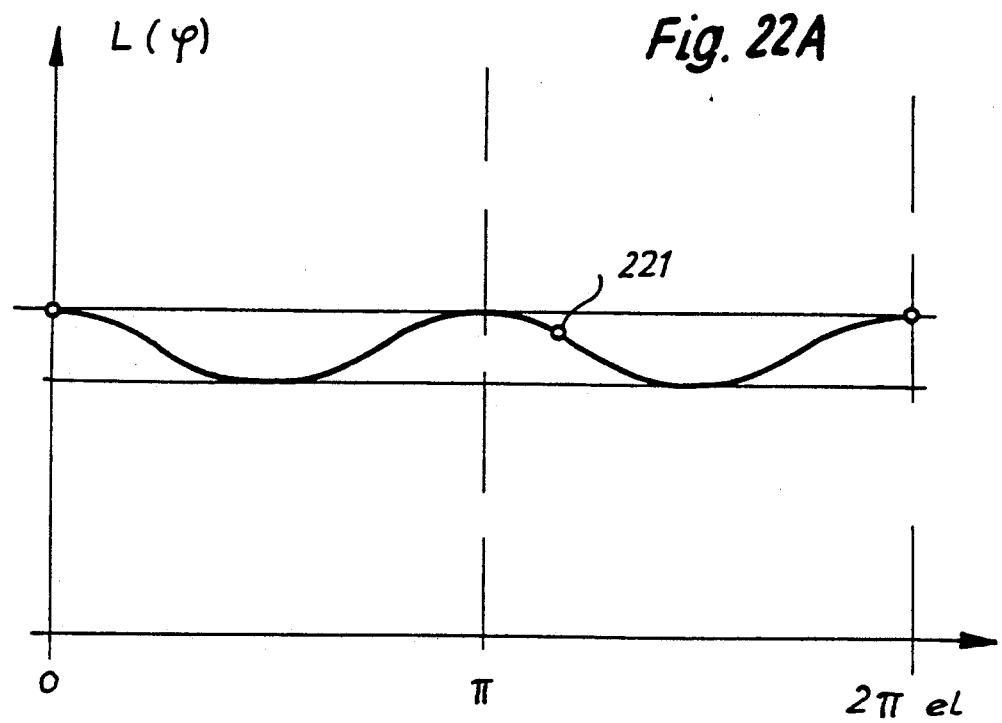
FIG. 22A The representation for inductance-dependent values relative 22B & 22C to the electrical angle.

In the case of a motor, FIG. 22A shows the path of a coil inductance over the rotor rotation angle. As a function of the motor construction, there are variations to the inductance of a few to several percent. As can be gathered from FIG. 22A, in such a motor type this function is periodic with a period of 180° el.

Figure 22B:
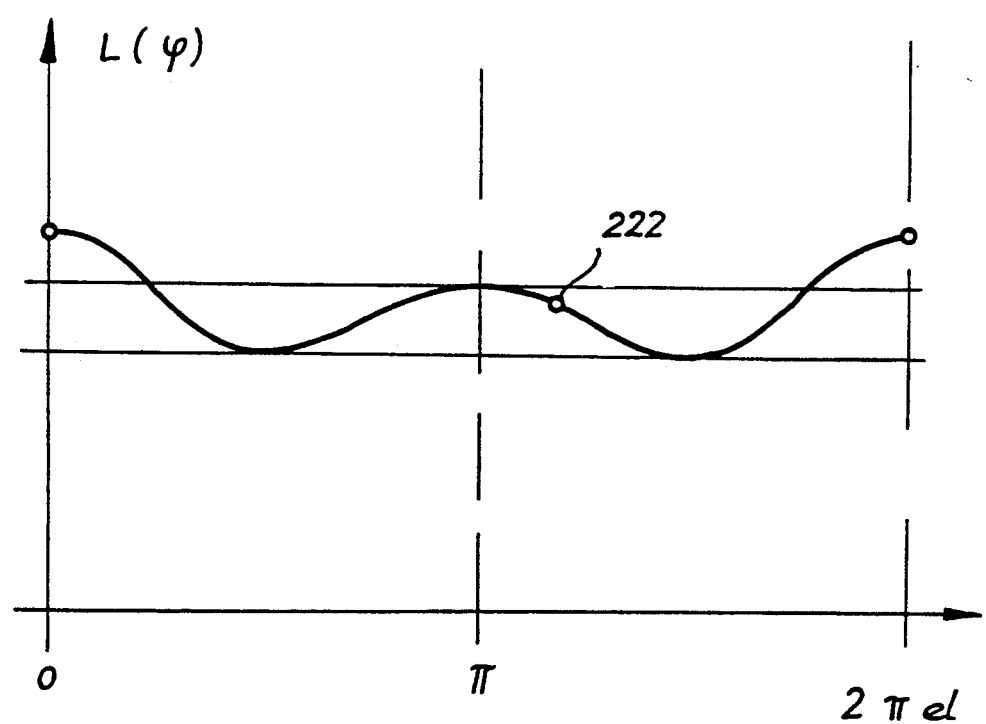

In the presence of permanent magnetic premagnetization said curve becomes asymmetrical (FIG. 22B) and then has a period of 360° el, so that clear measurements are possible in this angular range (360° el). The path of the curve in FIG. 22B is dependent on the strength or intensity of the premagnetization (through a permanent magnet) and can be further amplified by additional current application to further coils. The coils to which the current is applied in this way are partly saturated.

Figure 22C:
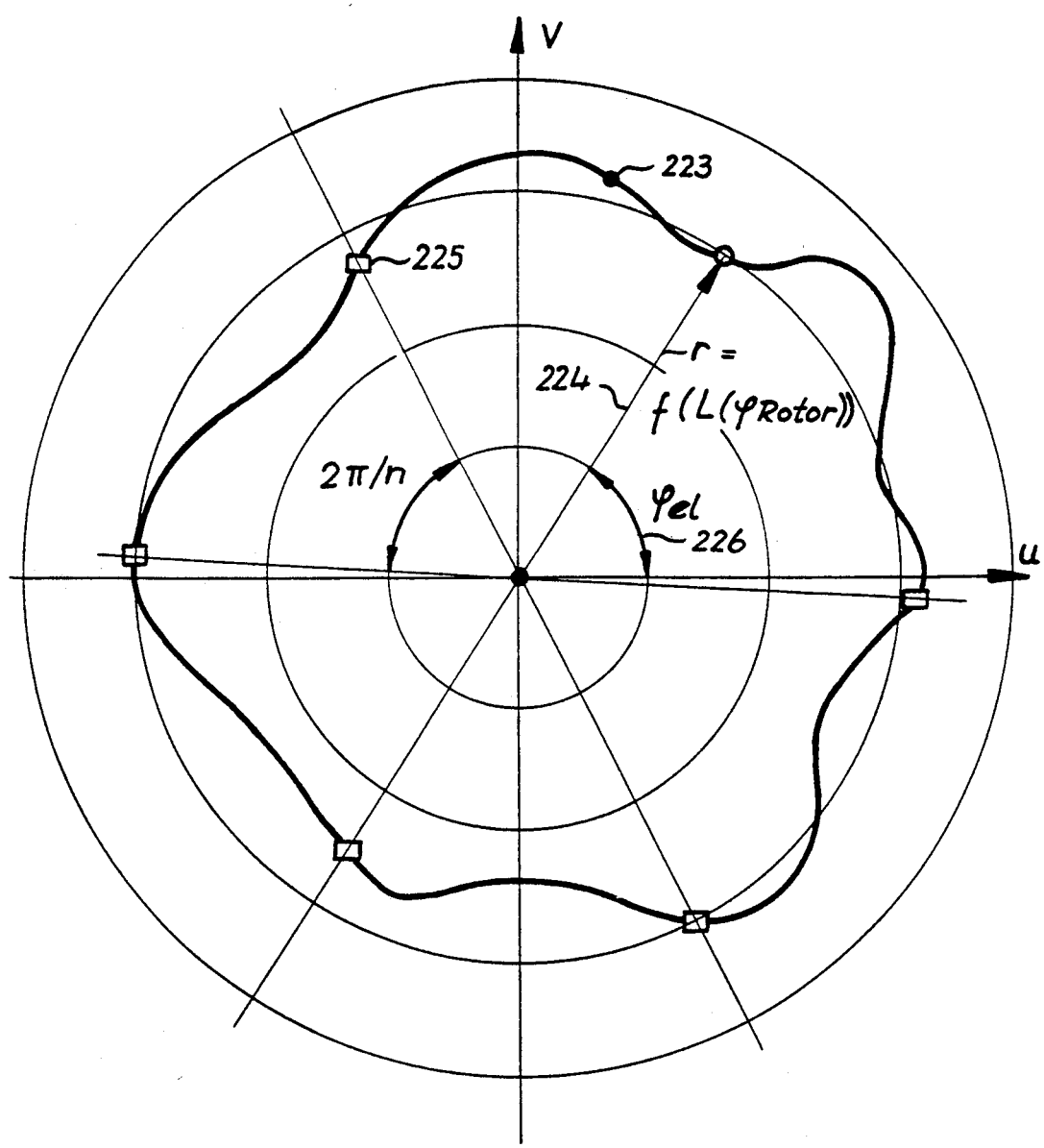

FIG. 22C shows the same conditions as in FIG. 22B, i.e. the inductance plotted in polar coordinates and a function of the motor rotation angle.

This path is similar for each of the motor coils. However, compared with an adjacent phase, there is a corresponding phase displacement of 360° el:n, in which n is the number of motor phases. This means the following connection found according to the invention. If a motor e.g. has six phases and all of these successively carry out almost simultaneously inductance measurements, the measured values obtained also define a curve, which can also be plotted in polar coordinates (FIG. 22C). Independently of the rotor position, all curves determined in this way have the same basic shape. However, they are rotated about a phase angle compared with a standardized representation, i.e. the curve associated with a basic position. Simultaneously this phase angle is surprisingly also a measure of the rotor position. It is clear that the dependence of the inductance of a phase on the rotor position should be as great as possible, so as to be able to perform a clear and unambiguous measurement.

An additional inventive possibility for bringing about this dependence comprises designing rotor permanent magnets in such a way that there is a non-uniformly high effective field strength of these permanent magnets. This can e.g. take place in that on magnetizing the rotor a non-uniformly high magnetization is carried out or, after magnetization, there is a planned demagnetization of individual magnetic poles.

Another possibility consists of following one combination of equally strong north and south pole rotor magnetic poles by another identical combination, but whose effective field strength is reduced by a constant amount.

Figure 11A:
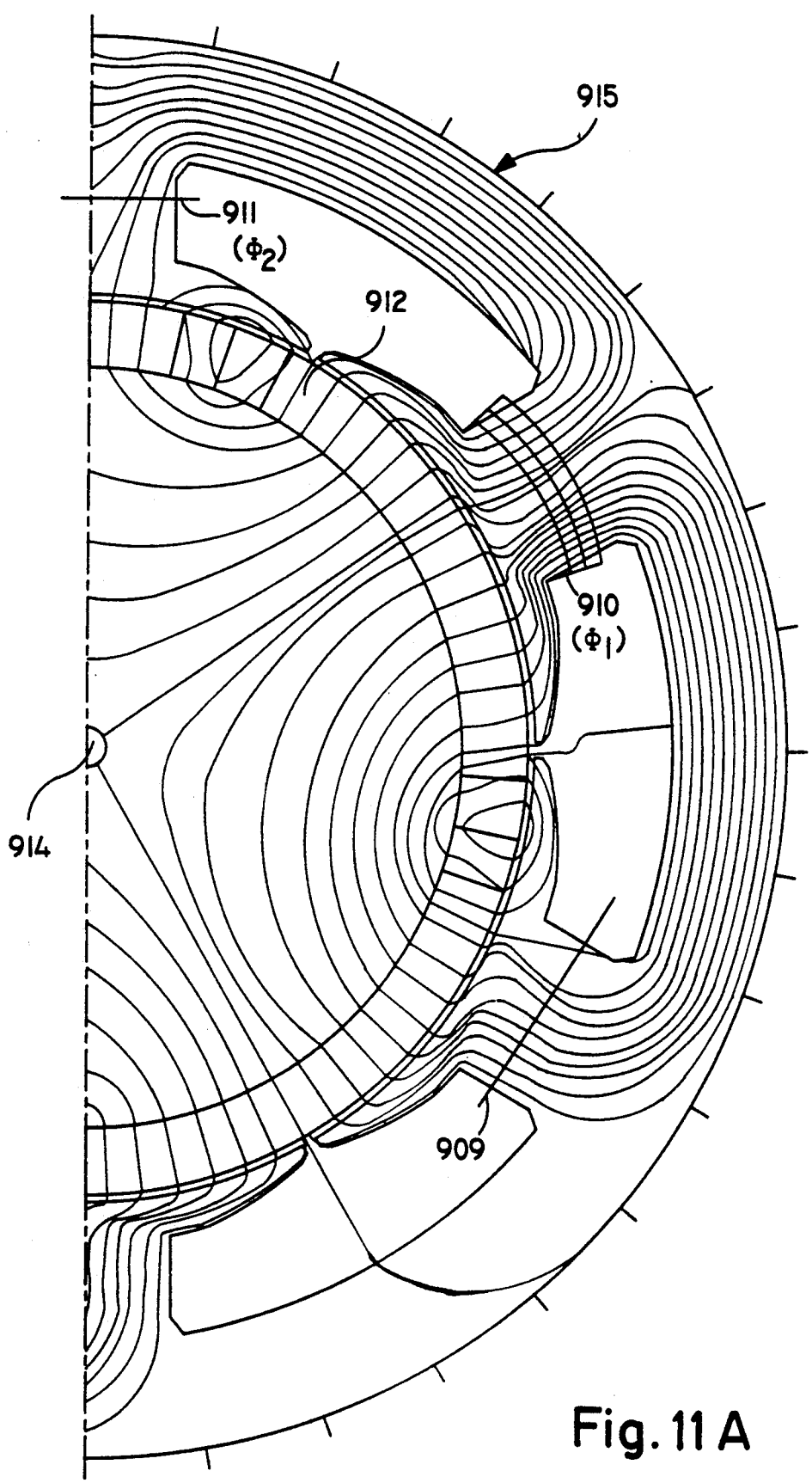
FIG. 11A A further flux pattern for a non-symmetrical rotor position of the motor of FIG. 9.
Figure 11B:
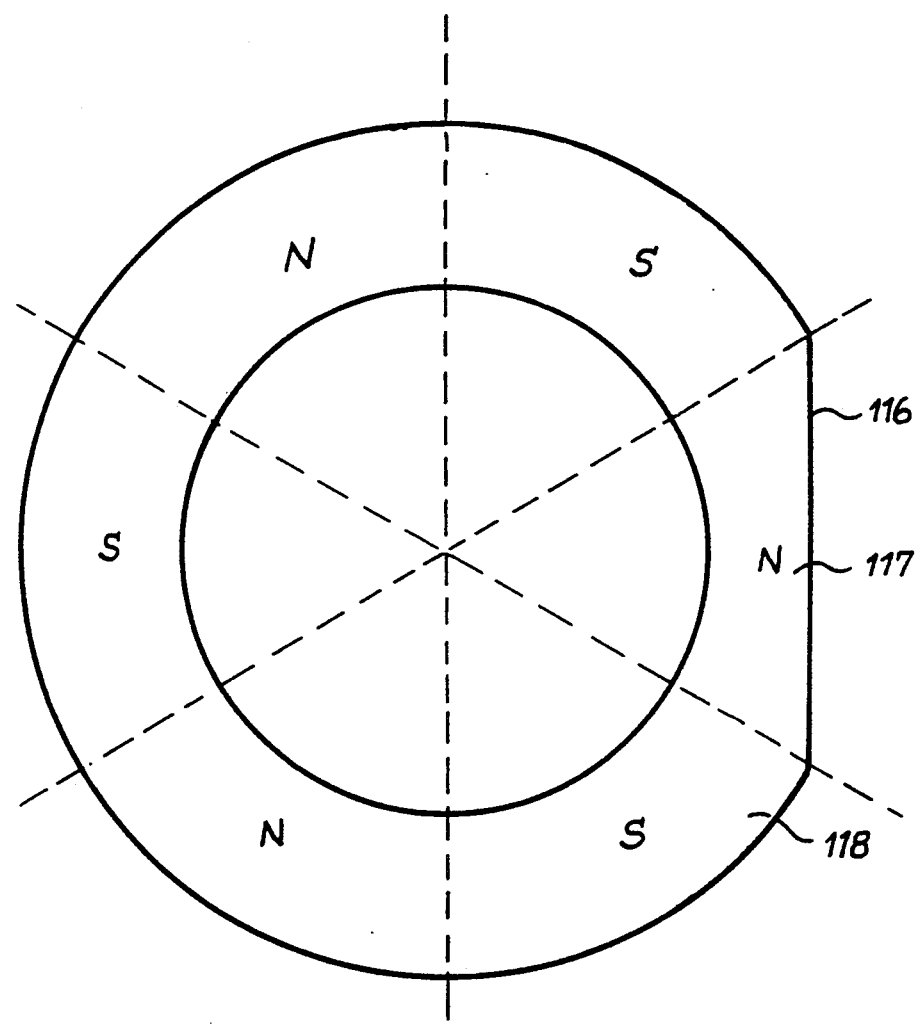
FIG. 11B The construction of the rotor for a flat motor with a different construction of the individual rotor poles.
Figure 11C:
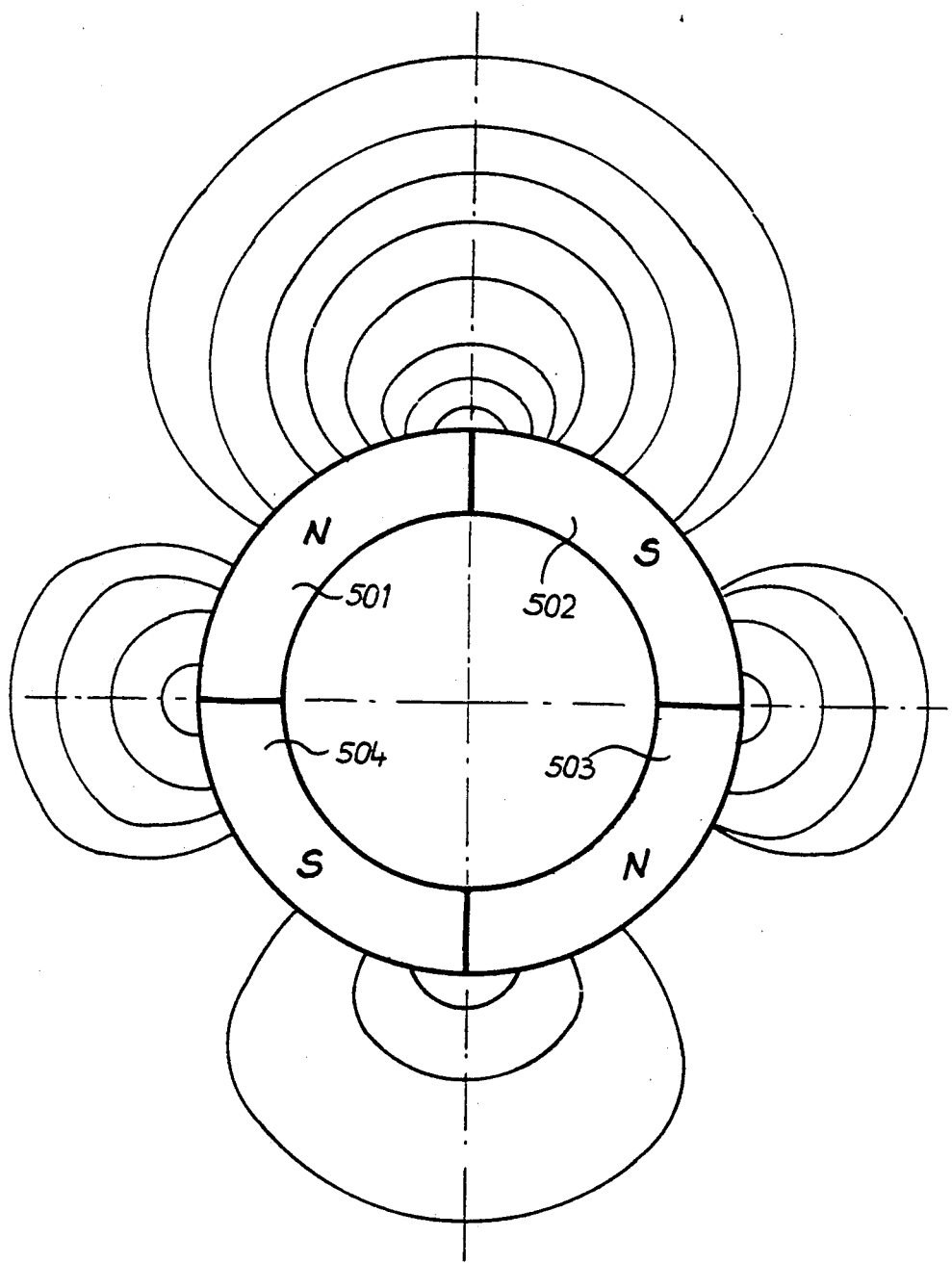
FIG. 11C The construction of a rotor as in FIGS. 8 to 11A with different magnetization of individual rotor poles.

These connections and associations are further explained relative to FIGS. 11B and 11C. In FIG. 11C e.g. the rotor magnetic poles 501, 502 are more strongly magnetized than the rotor magnetic poles 503 and 504.

Figure 11D:
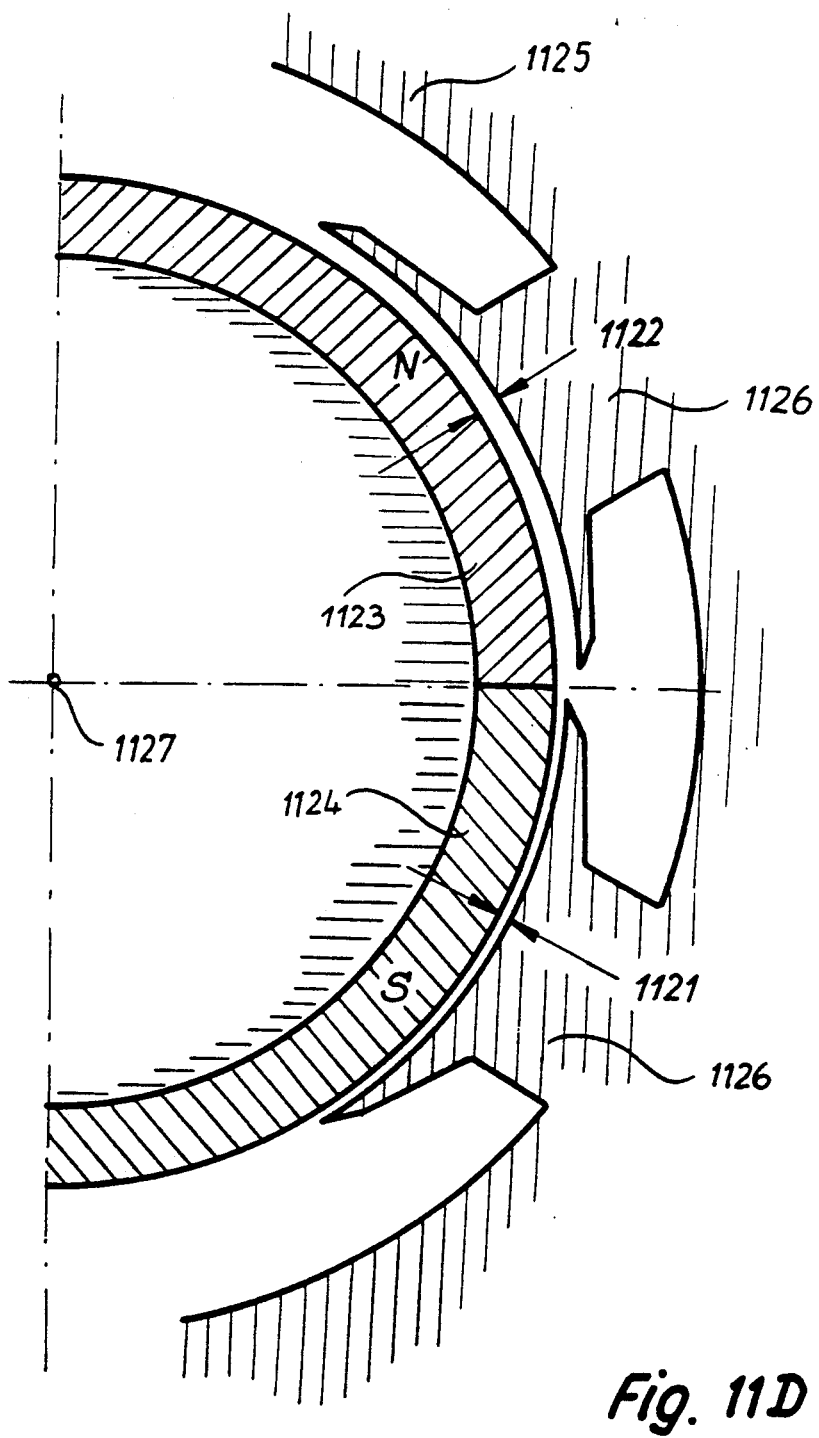
FIG. 11D A motor construction with a different construction of the air gap under individual stator poles.

In place of differently strongly magnetized permanent magnets of the rotor, alternatively or additionally it is possible to use an arrangement of varyingly large air gaps 1121, 1122, cf. FIG. 11D.

Figure 11E:
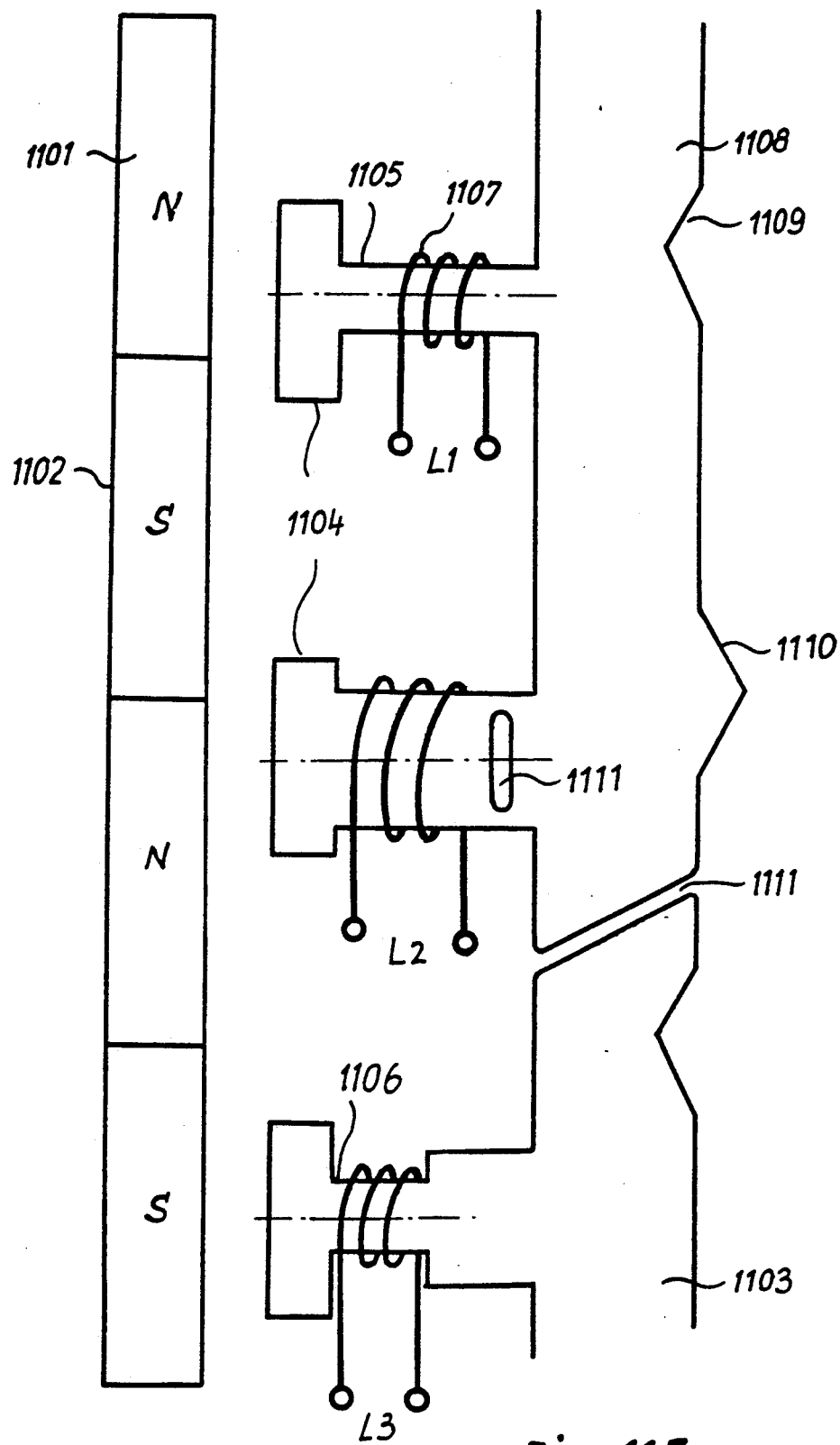
FIG. 11E Diagrammatically variants for producing saturation in the stator iron.

The same effect is obtained when using an arrangement of magnetic partial resistors, which have a different size. This can e.g. be set up in that the ferromagnetic coil cores are given a different size or in that yoke elements of the magnetic circuits are given a different magnetic resistance, either by varying the length or cross-section, or by the insertion of air gaps. The embodiment of FIG. 11E represents a linear motor, which has as the rotor element a permanent magnet with north poles 1101 and south poles 1102. Opposite the magnetic poles are provided the stator unit 1103 with stator pole shoes 1104. By means of specially shaped stator webs in elongated form (1105) or short form (1106), the stator pole shoes are connected to the return plates 1108.

The stator webs are wound with corresponding coils 1107. Compared with the normal cross-section, the return plates 1103 can have a reduced cross-section 1109 or an increased cross-section 1110. It is also appropriate to insert an air gap 1111. The advantage of these arrangements is that through the varyingly high magnetization within the magnetic circuit, an additional, position-dependent information (encoding) is introduced into the motor or position sensor. This permits a more precise and geometrically more extensive position determination, which allows an absolute position determination within the full rotation angle of 360° el. The inventive procedure, according to which by high and pulse-like current application certain ferromagnetic components of the magnetic circuit are brought close to or into magnetic saturation, naturally presupposes that the permanent magnets are provided with a sufficiently high coercive field strength, because there must be no demagnetization of the magnets as a result of the current application for position measurement purposes. Thus, when using alnico magnets, particular attention must be paid to this point. When using modern magnetic materials, such as e.g. rare earth-cobalt materials or neodymium-iron-boron materials no problems occur in this connection.

Before calculating an actual position of the rotor, it is firstly necessary to obtain a sufficiently large number of measured values. It is appropriate to separate the determination of the measured values and the associated evaluation, so that measured value determination takes place as quickly as possible. The faster the motor rotor moves, the greater the attention which must be paid to this requirement. A mixing of measured values from different positions must also be expected, so that a clear reconstruction can only be obtained with difficulty or maybe impossible. In the evaluation phase time restrictions of this type are not as critical. However, it is favourable to limit the evaluation phase to a time minimum, so as to obtain maximum comprehensive measurement data through a maximum number of measured values per time unit.

Although other procedures are possible, the following is the most appropriate for determining the measured values. Current is applied to a predetermined stator winding with the aim of obtaining high magnetization of its ferromagnetic core. The current in this stator winding is recorded at several times. This current flow is e.g. designated I1 in the pulse sequence 1 in FIG. 12. For example, besides continuous current recording, only a single measurement point M1 may be observed. For this purpose the associated current value is determined, e.g. following a predetermined time difference $t1-t0$. It is alternatively possible at a predetermined current value, e.g. half the maximum current value, to determine the time requirement until the current has risen from 0 to this value. (The current I1 is connected in at t o and measured at t 1). In parallel or with a slight time displacement, i.e. in the range of approximately 10 to 1000 microseconds, this process is repeated in a further stator coil, without the first stator coil being disconnected.

Figure 12:
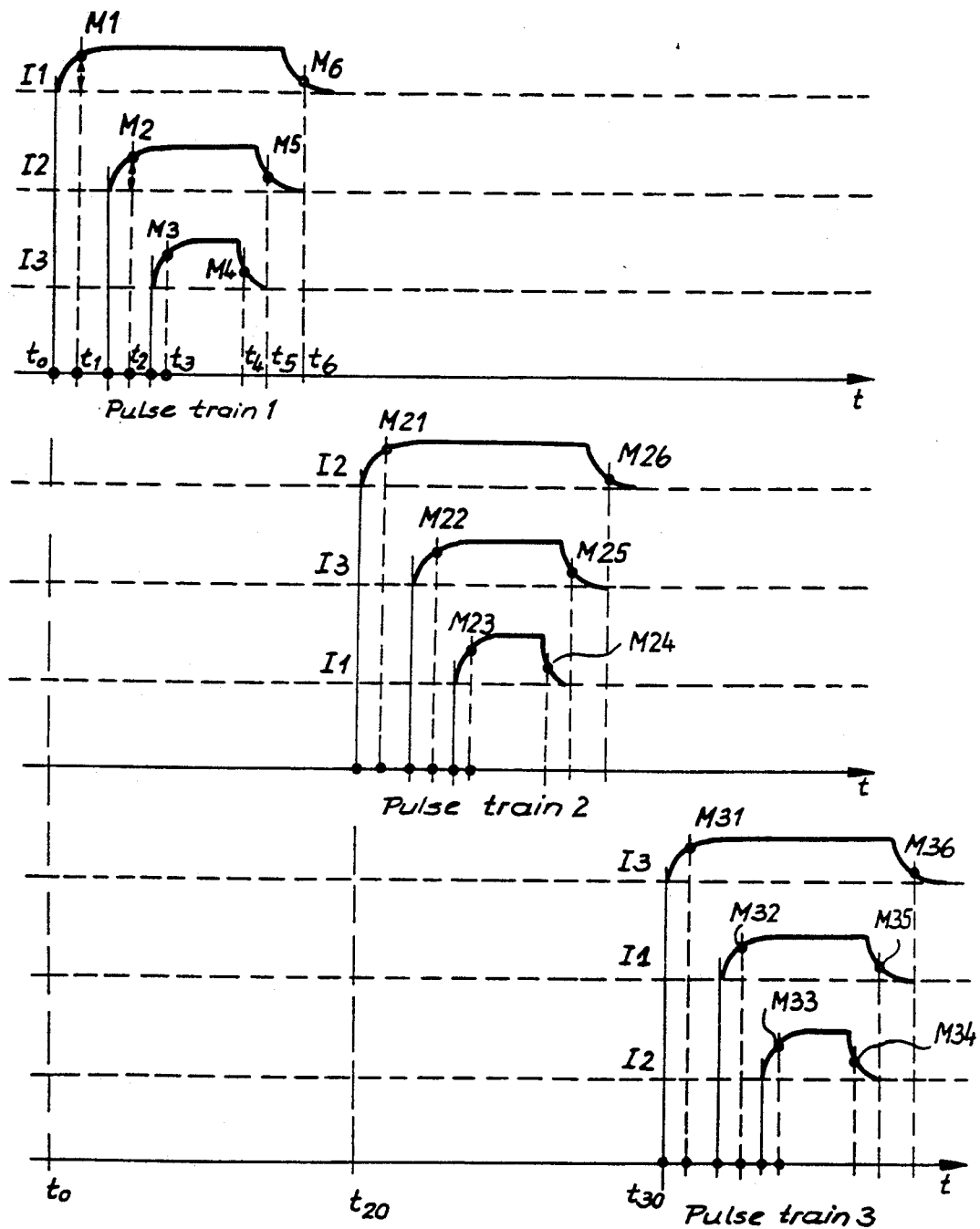
FIG. 12 The current application pattern for measured value obtention.

FIG. 12 shows this time connection for the current application to a selected number of three coils, whose current is designated I1, I2 and I3. If there are further coils, it is possible to use for a more extensive information obtention, one or more additional processes of the same type on a fourth or further stator coils. After current has been supplied to all the stator coils in question, disconnection either takes place completely and simultaneously or, as shown in FIG. 12 for the pulse sequences 1, 2 and 3, there is a clearly defined disconnection procedure. Also in these two cases it is possible to perform time and/or amplitude measurements, e.g. the amplitudes M4, M5 and M6 at the times t4, t5 and t6.

Thus, it is e.g. possible to switch the coils in currentless manner in the reverse order compared with the connection frequency. In this way in a first pulse sequence 1 is obtained a first set of measured values, which in the simplest case consists of a single value. If two measured values are obtained per coil, as shown in FIG. 12, then for a motor with three coils there are six measured values M1 to M6. It is also naturally possible to obtain additional measured points from rising and falling slopes and to allow them to influence the further calculation. Normally attempts are made to select a few representative measured values from the plurality thereof.

With an individual, first pulse sequence it is not generally possible to carry out a position determination and further measured value sets must be obtained for this purpose. The associated procedure is illustrated in FIG. 2 with the current application curves of pulse sequences 2 and 3. This constitutes a similar process to that for pulse sequence 1, but the current application commences with a stator coil close to the coil 1.

For a motor with three coils, current application can e.g. commence with coil 2 and shortly thereafter current application to coil 3 and then coil 1 takes place. Correspondingly to the current application process during the pulse train 1, also during the pulse train 2 the current application to the individual coils is broken off at given times. In a pulse train 3 the procedure is repeated again, but beginning with coil 3, followed by coil 1 and then coil 2. If there are more than three coils, then more complicated application sequences can be performed. Therefore the specification for the quasi-simultaneous current application to further coils will correspondingly relate to coils having comparable spacings with respect to the next coil to which current is to be applied. Thus, after the start of current application to one coil, current can be applied to a directly adjacent coil.

The second current application process can also relate to a coil which is at some distance from the coil to which current was first applied. A fixing of the most useful coil current application sequence must take place individually as a function of the motor type. In order to obtain complete data the process is repeated several times. Current application begins in each case with a different stator coil. Current obtention is complete if there is a cyclically produced measured value set on the basis of the same diagram for all the motor stator coils.

However, it is also possible to carry out a simpler position determination with reduced precision. For this purpose it is sufficient to have a smaller data quantity, which only comprises measured value sets emanating from fewer stator coils than the number of the latter actually present in the motor or position sensor. For three-phase motors with e.g. six stator coils, it is e.g. merely sufficient to analyze three measured value sets, it being advantageous if said sets are obtained for every other coil.

After a predetermined number of measured value sets has been obtained, evaluation is carried out (as a function of the efficiency of the evaluation unit evaluation can naturally also take place during the obtention of the measured value sets). As a function of the necessary speed with which the simply structured data sets are to be evaluated, for the measured value analysis it is preferable to use a special microprocessor or controller 23, whose program is tailor-made to the position detection problem to be solved, but which can also be used for regular motor operation. For this purpose it is e.g. possible to use a standard processor 23 with an associated, externally positioned expander circuit or commutating processor 100.

Another possibility consists of combining units 23 and 100, so that a standard processor unit is present on the same silicon surface, which is supplemented by customer-specific additional functional units.

For mean value formation, the measured values determined in a pulse train, e.g. 1 in FIG. 12 are appropriately combined to form a single, representative measured value. As the measurement accuracy of the individual measured values M1 to M6 can be of varying levels, it is appropriate to carry out a weighting in the case of the necessary mean value formation. This can e.g. consist of calculating a mean value m1 from the measured values M1 to M6 according to the following or a similar calculating rule (FIG. 13), the weighting factors having to be individually determined, e.g.:

$m1 = (0.8*M1 + 0.3*M2 + 0.1*M3 + 0.7*M4 + 0.3*M5 + 0.1*M6)/6$

Figure 14:
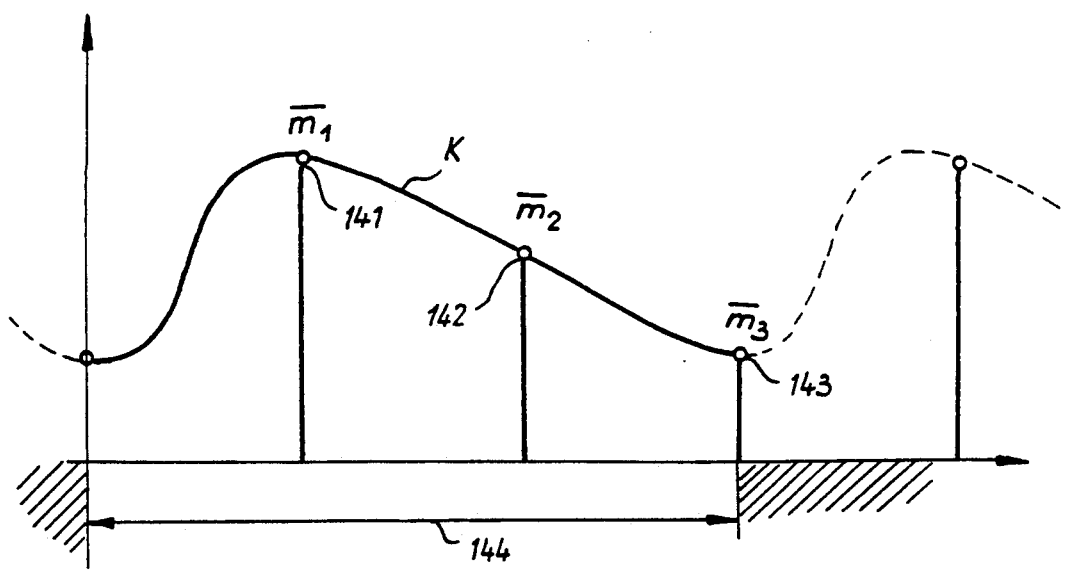
FIG. 14 The linear arrangement of several position-dependent mean values.
Figure 15:
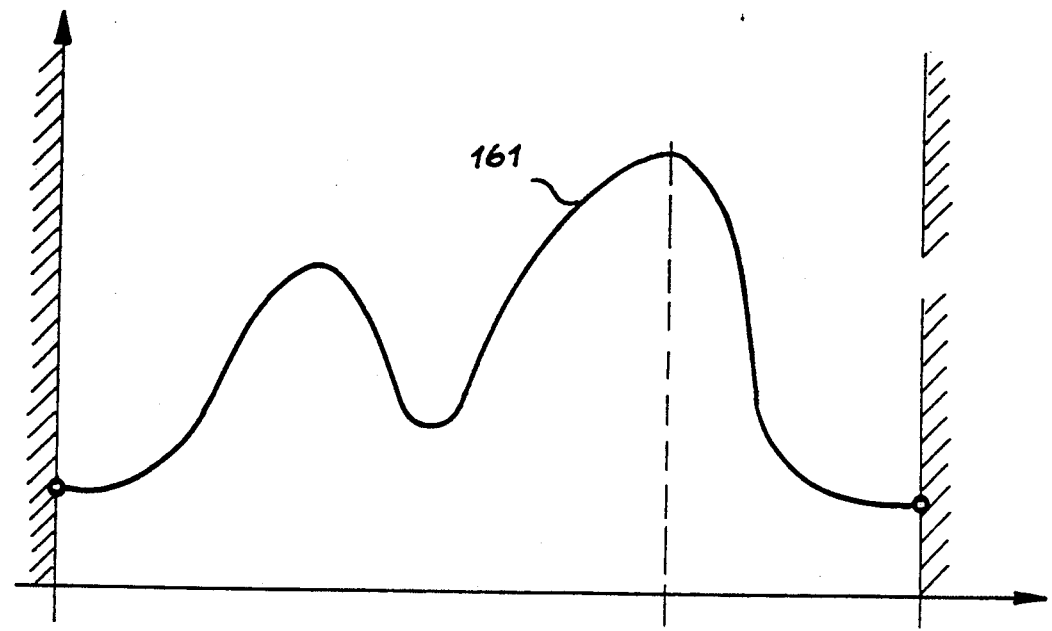
FIG. 15 The position comparison between two phase-displaced curves.
Figure 15:
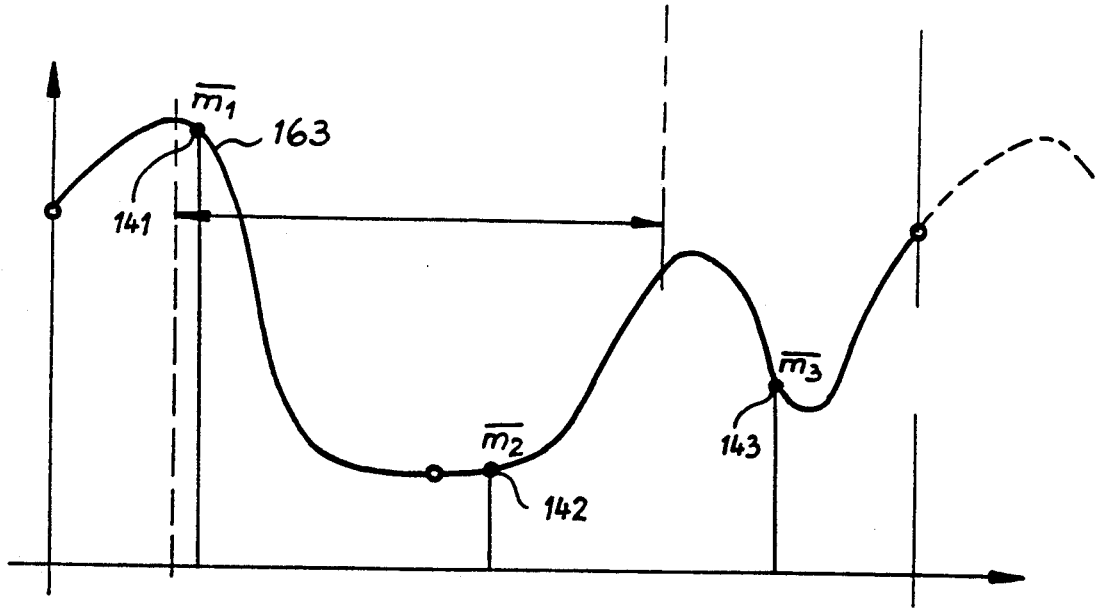

A similar mean value formation with the same coefficients can be used for the pulse train 2 on the measured values M21 to M26, which gives a mean value m2. The same applies with respect to the pulse train 3, where the measured values M31 to M36 must be multiplied with the same coefficients, which gives a mean value m3. The mean values m1 to m3 implicitly contain the sought position information, which must still be calculated therefrom in explicit form. FIGS. 14 and 15 (lower half) show in linear from the amplitudes of the calculated mean values $m1-m3$. In the specific case it can also be: $m1=M1$, $m2=M21$, $m3=M31$, etc.

If there are further pulse trains, e.g. not shown pulse trains 4, 5, 6, etc., then the associated mean values m4, m5, m6, etc. are to be determined by comparable procedures.

Figure 16:
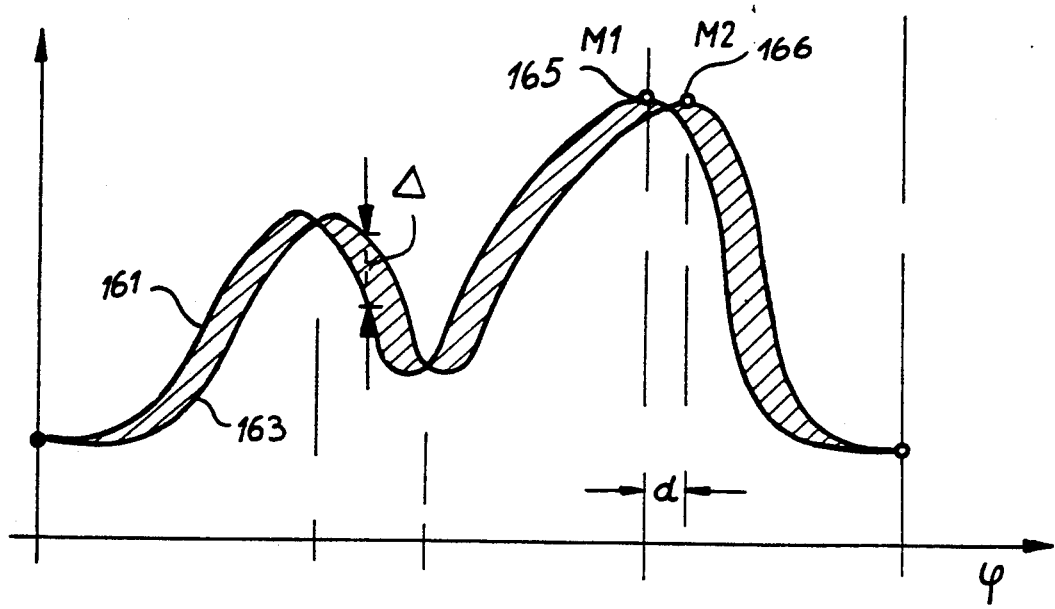
FIG. 16a Different methods for carrying out the position comparison of to 16C two phase-displaced curves.
Figure 16:
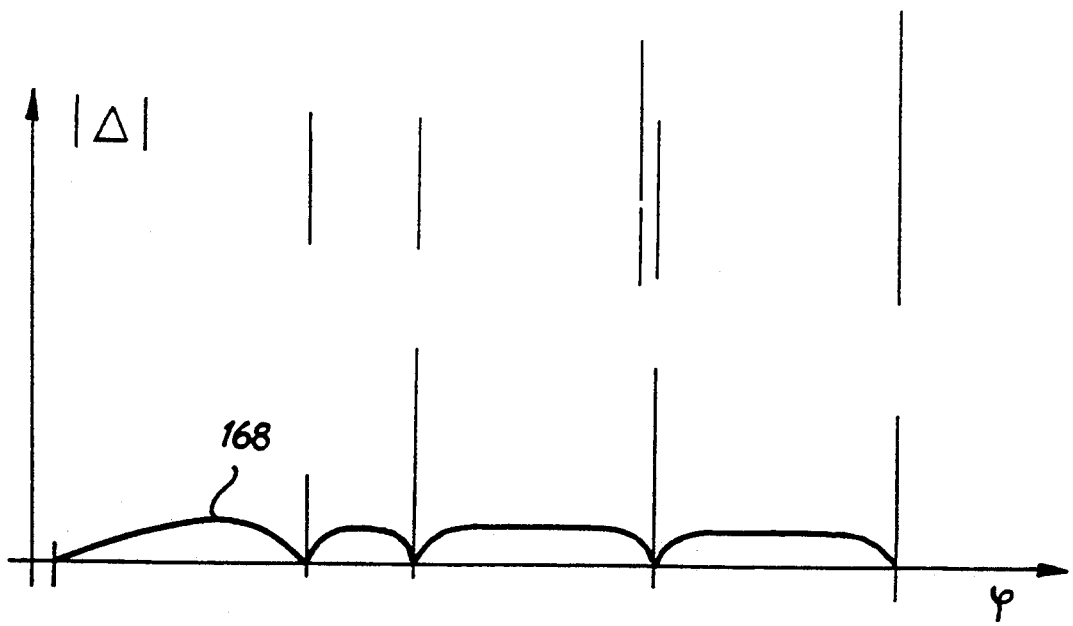
Figure 16:
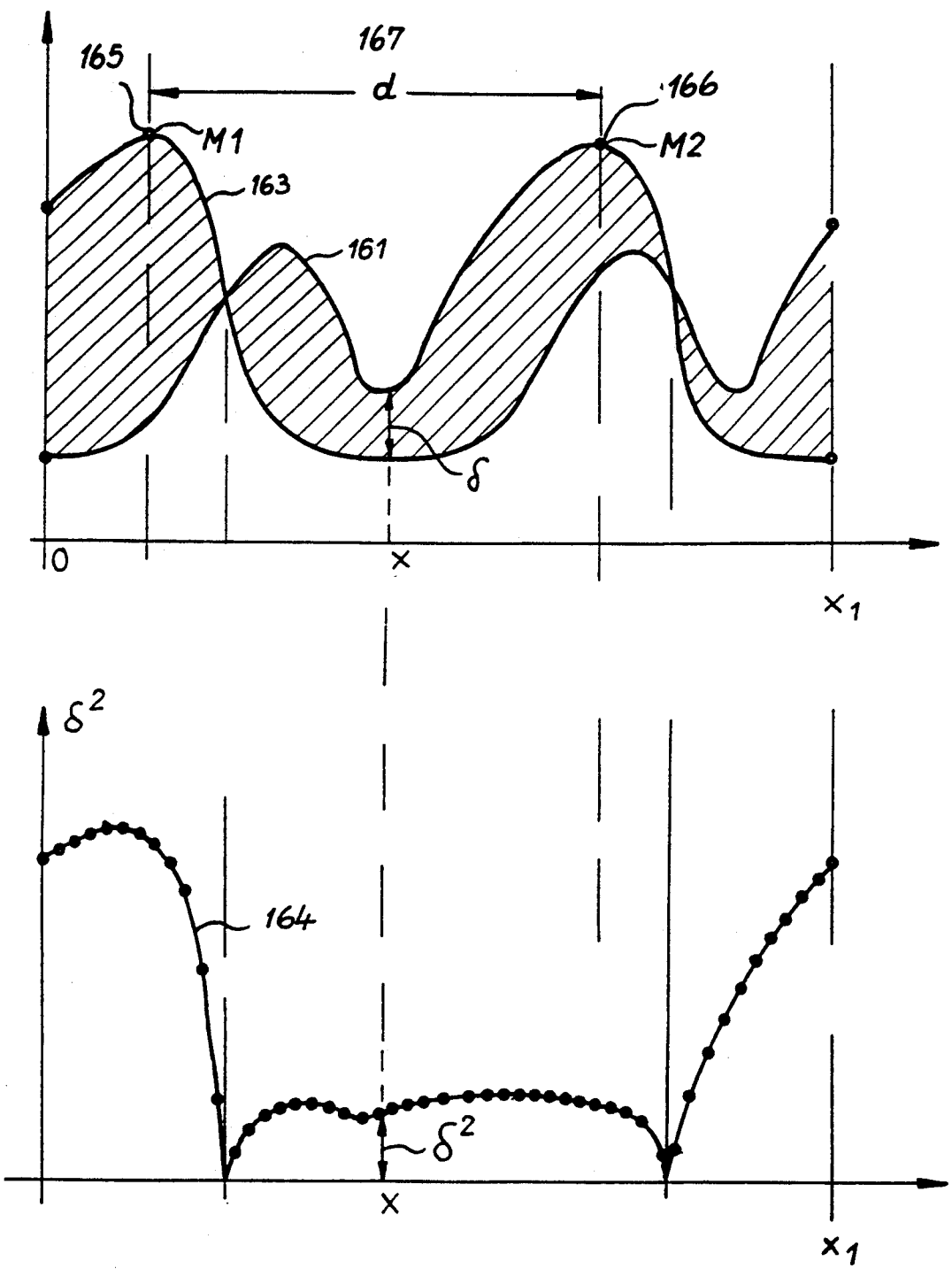

As the evaluation of values determined in this way has surprisingly shown, through each measured value multiplet obtained in this way it is possible to place a substantially identical periodic curve K, as shown e.g. in FIG. 14 or by reference 161 or 163 in FIG. 15, but whose phase position must be varied until the measured values, here e.g. m1 to m3, are located on the curve (FIG. 15 and FIG. 16A). The measure of the periodicity for this curve is designated 144 in FIG. 14. The measure of said phase displacement constitutes a characteristic value for the actual motor rotor position.

Figure 19:
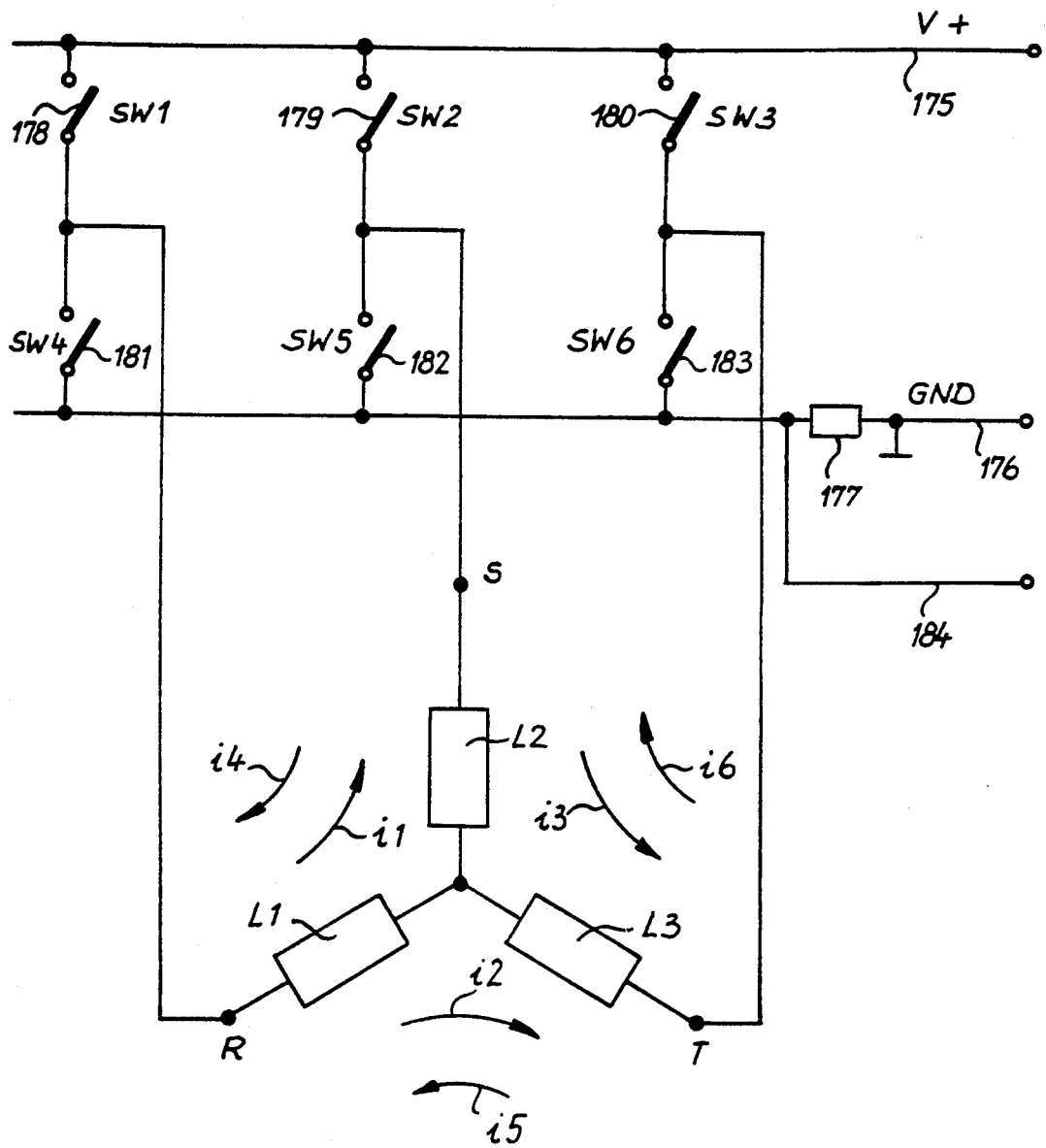
FIG. 19A A diagram for the current application to three coils by means of six switches.
FIG. 19B The resulting current flow in the coils of FIG. 19A for two closed switches.
FIG. 19C A simple current application sequence and six associated current paths.
FIG. 19D A diagram for determining the fundamental wave of a function and in fact graphically with six values m1 to m6 (corresponding to a motor with three or six phases L1 to L6, as shown e.g.
Figure 19B:
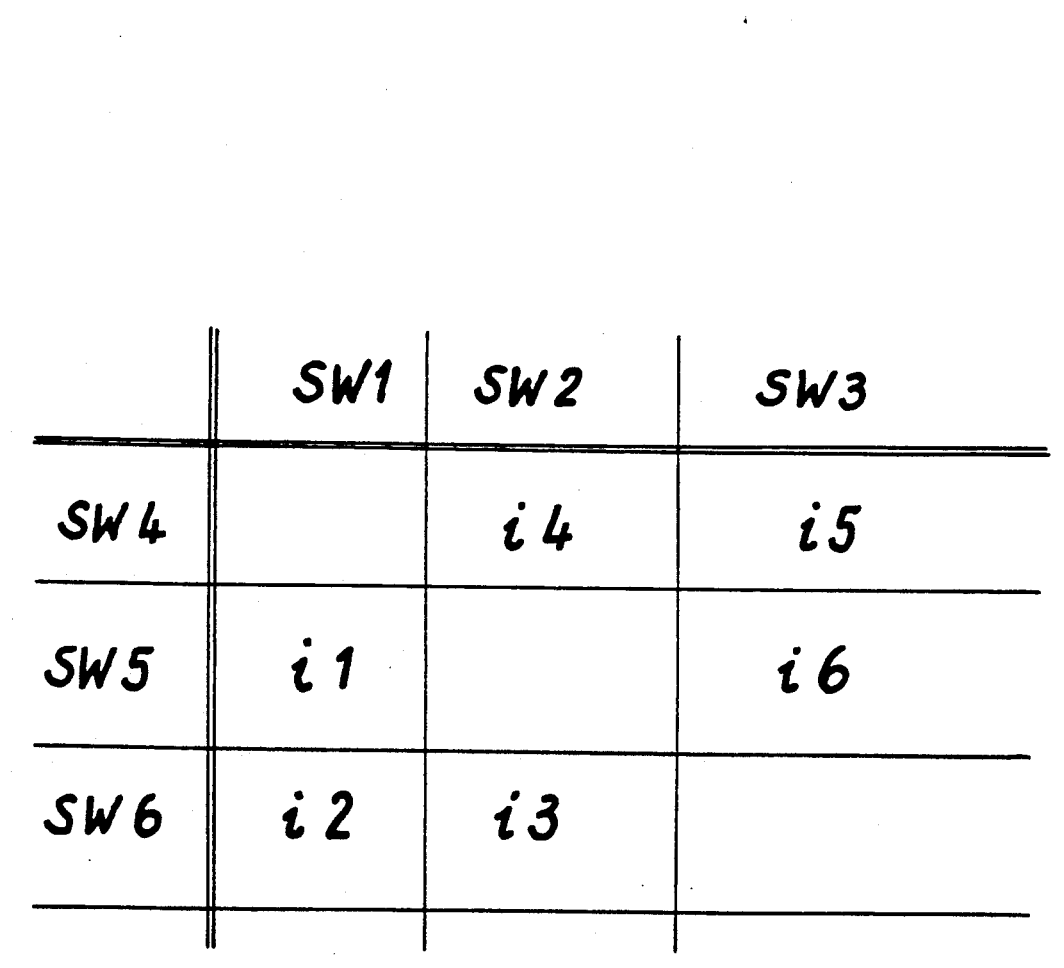
Figure 19:
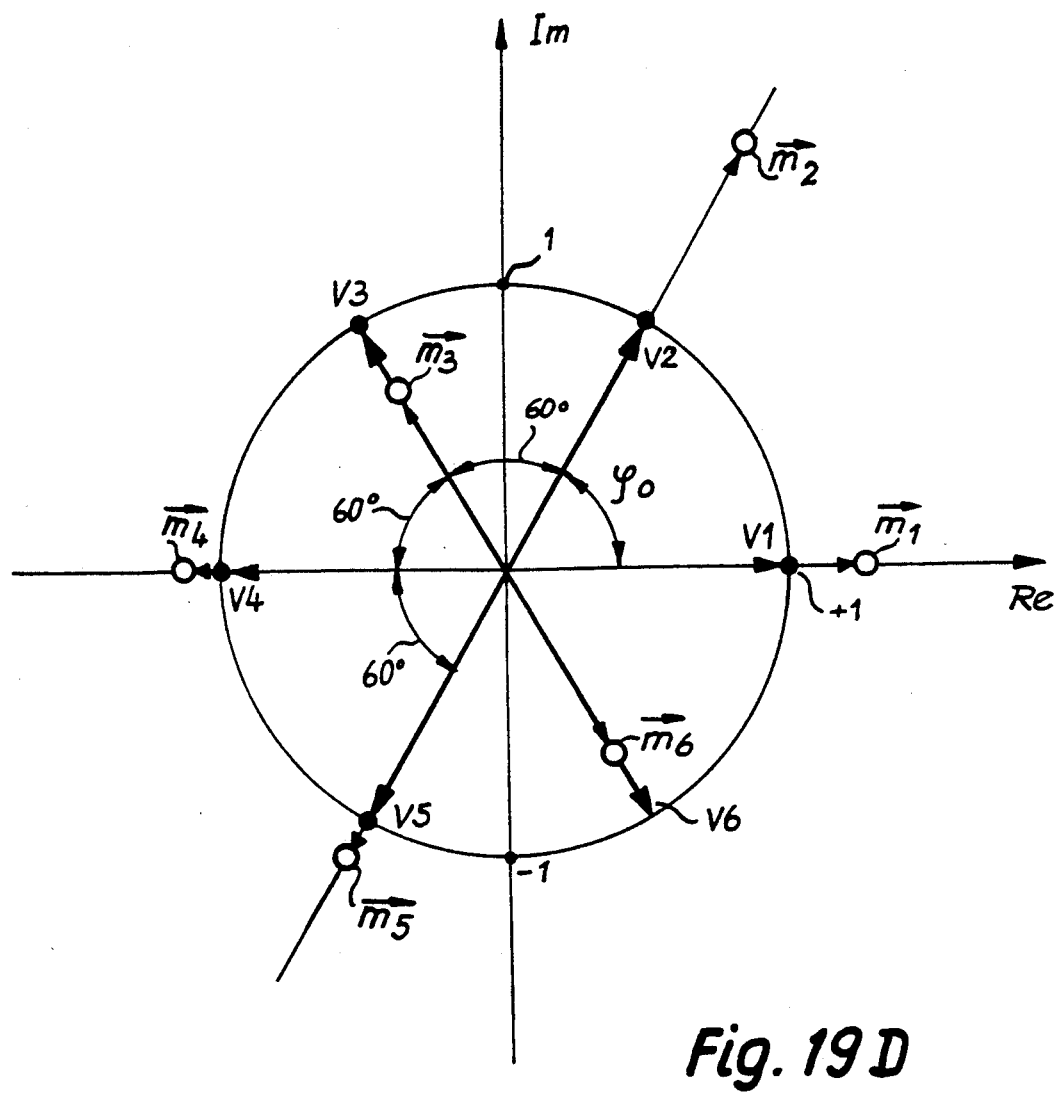

One form of determining six values m1 to m6 is shown in FIGS. 19A and 19B. Three motor coils L1, L2, L3 with terminals R, S and T are supplied with current via a switch set SW1 to SW6 (reference numerals 178 to 183). In each case one of the switches SW1 to SW6 and one of the switches SW4 to SW6 is simultaneously closed. Thus, there is a current flow from the supply line 175 across the coils and the current sensor 177 to the ground potential line 176, the magnitude of the current being determined via the sensor line 184.

The resulting current flows are defined in FIG. 19B. In the crossing points of rows and columns, the current flow is given for in each case two switches and in this way six switching possibilities are provided. A current application for determining the rotor position then takes place e.g. in accordance with FIG. 19C.

Firstly SW1 and SW5 are used for producing the current flow i1 which, rises in accordance with a rising slope 190, whose intensity is measured after the time interval 193 and gives a value m1. On reaching a predetermined current application time the current is interrupted by opening the switches, which leads to a disconnection slope 191. This procedure with relatively fast connection and disconnection times is repeated according to the other switch combinations shown in FIG. 19B for five further current applications i2 to i6 and in each case following the time interval 193 the associated value m2, m3, . . . , m6 is determined and buffer stored for further evaluation. Although this process is somewhat more complicated than the obtaining of only three values m1, m2 and m3, the rotor position determination precision is increased. As stated, the aim is to place a known curve through the measured values obtained in this way and the phase is to be displaced in such a way that the measured values are located on or as close as possible to the curve.

This phase displacement can be mathematically determined in several different ways. One possibility is e.g. to initially determine a curve K, which interconnects the measured values in an optimum manner. This procedure has the advantage that on comparing a curve found with a reference curve not only a few, but a random number of points can be compared with one another (FIG. 14). In this way the individual points of a curve found can be displaced in fine steps until both curves to be compared have an almost congruent position.

In order to generate a very smooth curve from a measured value set with e.g. three or six or further mean value points, different known calculating rules can be used. One of these consists of using mean values $m1-mn$ obtained as input variables for a Fourier analysis. These mean values are multiplied with suitable, complex coefficients, e.g. the nth unit cubes and are subject to complex summation. The process is performed individually in per se known manner for all the spectral components. These spectral components are sine or cosine terms, by means of which it is possible to construct a relatively smooth connecting function through the measurement points. The precise functional representation of the connecting curve is, in known manner, obtained by a so-called inverse transformation.

However, according to the invention it is advantageous in accordance with relevant known calculating instructions, to represent a so-called spline function, which represents an optimized continuous connection between all the points of the measured values set. The generation of such functions differs compared with the first-mentioned process in that the spectrum obtained is modified in a planned manner, or the functions are approximated e.g. by third degree polynominals. In this way a limited number of points $n1 \ldots nm$ of a mean value set is transferred into a random number of points of matching spline functions.

For carrying out the position-characteristic determination comparison is necessary between the reference curve 161 and the actual curve 163 defined by the actual measured values (FIG. 15). This is performed in the following way. Both curves, referred to hereinafter as measurement function and reference function, are periodically supplemented outside the periodicity range 144 by others having the length of said range 144. The two curves are checked for correlation, i.e. coincidence or similarity, with the aid of a conventional calculating process.

According to the invention this most appropriately takes place by the use of the method of least squares (FIG. 16B), where the measurement curve is 163, the reference curve 161 and their maxima 165 or 166 have the spacing d, 167. For an agreed number of measurement and reference function values, the difference between in each case two associated function values is determined and squared (curve 164). The result is added to a sum total, i.e. the curve 164 is integrated between 0 and ×1. After this calculation has been performed for each function value pair, the similarity is detected by means of the sum total. If the sum found, i.e. the integral of the curve 164, is zero, then identical functions are present and the phase difference is zero. Therefore small sum values represent a large similarity of the functions, whereas large sum values represent small similarities of the functions.

It is obvious that in the case of the aforementioned summation, summation or integrated summation must take place over a standard interval 0 to ×1, which is at least as long as that defined e.g. by the reference function.

Figure 16C:
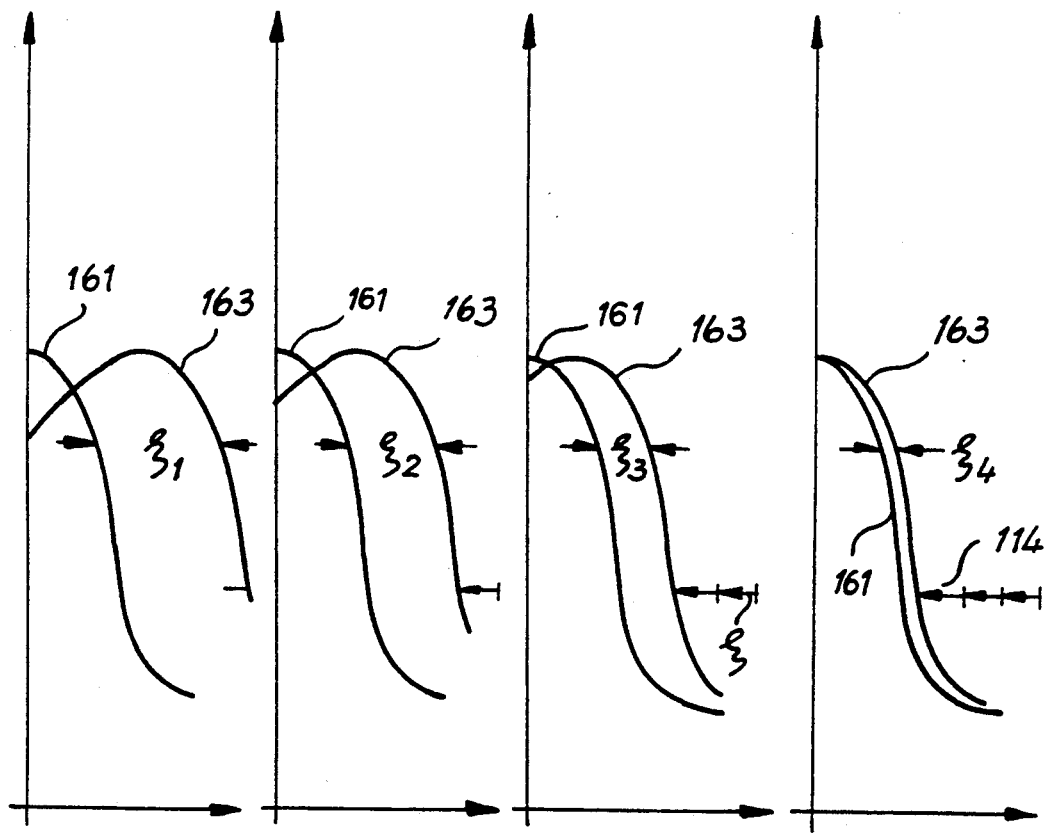

The position-characteristic determination is now carried out in such a way that the first summation process is followed by others. However, one of the two functions, including their supplements or additions on both sides, are successively further displaced by a phase angle xi 114 (FIG. 16C). For each phase displacement having a minimum summation result, the correlation is at a maximum, so that a numerical value for the phase displacement found in this way can be used as the rotor position characteristic.

For example, in FIG. 16C with the phase difference xi 4, an approximately complete coincidence of the curves 161 and 163 exists.

Another process consists of reciprocally displacing the reference and comparison functions until the sum of the absolute quantities of the differences of a number of function values of the reference and comparison function is as small as possible, this process being illustrated in FIG. 16A. The two functions to be compared have in each case a maximum 165 or 166 and the phase displacement is designated d. Through the function differences surfaces are generated and the resulting overall surface also constitutes a measure for the congruence of both functions.

As in the previous case, a minimum comparison amount, namely the integral of the function 168 between 0° and 360° el, amounts to a good coincidence of the curves. With a complete coincidence the difference surface amount is 0. The numerical values of the rotor position obtained in this way are clearly more accurate than the determination of a maximum value of different interpolation nodes of the function, as described in EU-A-251785. However, the calculating expenditure and effort for obtaining this improved precision is greater, because firstly it is necessary to determine the spline function values for interpolation nodes and then the optimum curve position must be determined by iterative curve comparison operations.

Both processes can be combined to solve a pattern detection problem. However, according to the invention there are further solutions for this problem.

Another such process is based on the centroid analysis method. For this purpose the values m1, m2, etc. are represented in graphic form, so that a surface is produced in the form of an irregular or regular polygon. In a particularly simple case a position characteristic is to be calculated from three values only, i.e. the mean values m1, m2 and m3.

Figure 17A:
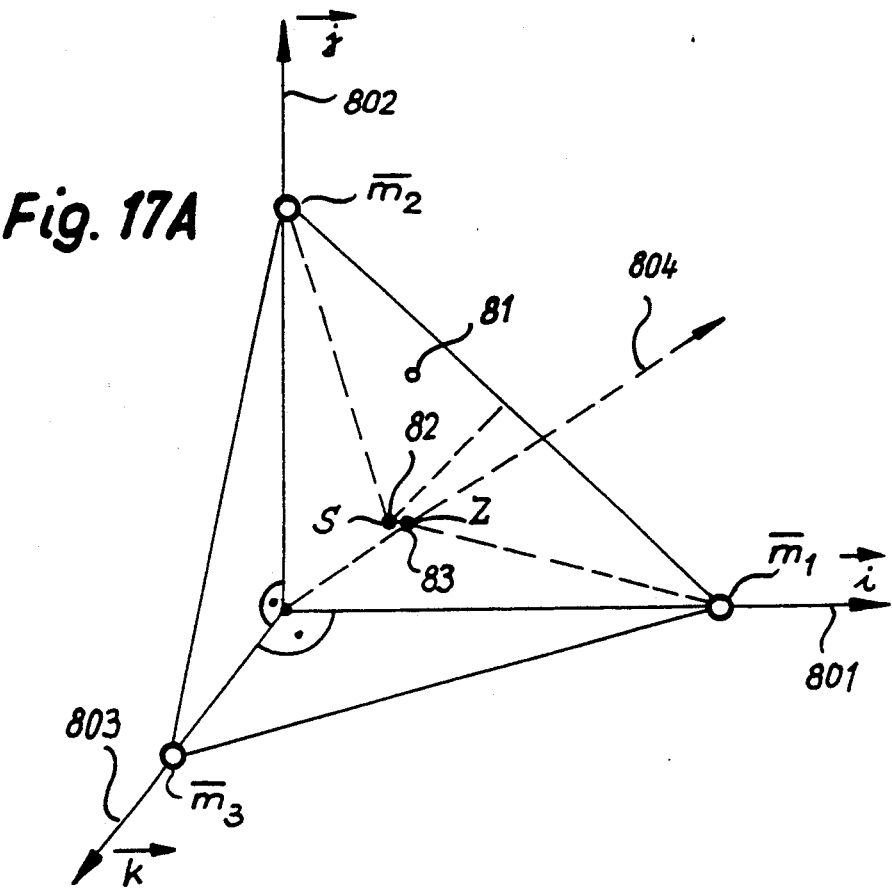
FIGS 17A The spatial representation of a measurement result comprising and 17B three individual measurements and its evaluation.

The associated inventive rules for calculating a position characteristic in this case comprise the three measured values m1, m2, m3 being plotted as axis portions in a three-dimensional cartesian coordinate system. Such a coordinate system, which is spanned by the three unit vectors i (801), j (802) and k (803), is shown in FIG. 17A. The latter also shows the space diagonal 804 passing through the origin and the point with the coordinates i, j, k, i.e. the space diagonal is defined by the origin of the coordinate system with the associated unit vectors i, j and k (801, 802, 803) and the vector sum i+j+k.

Figure 17B:
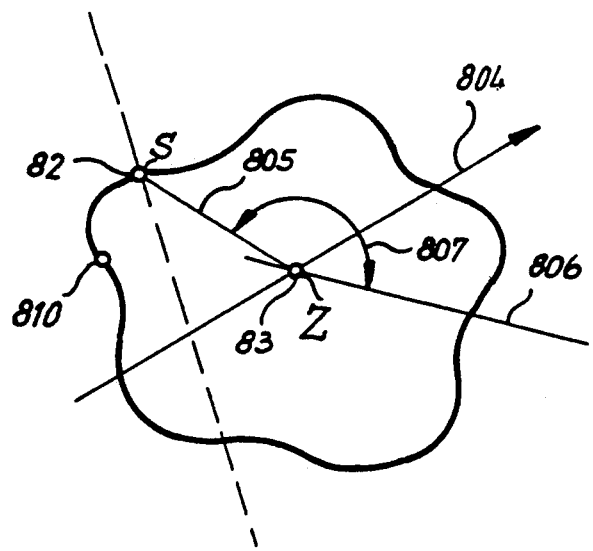

A first, second and third measured value m1, m2, m3 of a trio of values is in each case plotted in the direction i, j or k. In this way a triangle 81 is defined, whose (surface) centroid S, 82, as a function of the trio of measured values to be used as a basis, is of varying form, because in the case of a different position of the rotor position to be determined different trios of measured values have to be evaluated. This surface centroid S can be determined by drawing or also by calculation/mathematically and is located on a curve 810 (FIG. 17B), which essentially passes in cycloid manner around the space diagonal 804 and which is shown on a larger scale in FIG. 17B. The space diagonal 804 passes through the triangle 81 in a centre Z, reference 83.

Together with the centroid 82, which varies as a function of the measured values, the centre 83 defines a straight line 804 located on the triangle 801, based on a straight line 806 between the center 83 and an angle point or corner, e.g. m1 of the triangle 81, a clearly defined angle 807 in the plane of the triangle. This angle 807 is used as the position characteristic for the rotor position and further processed.

Figure 18:
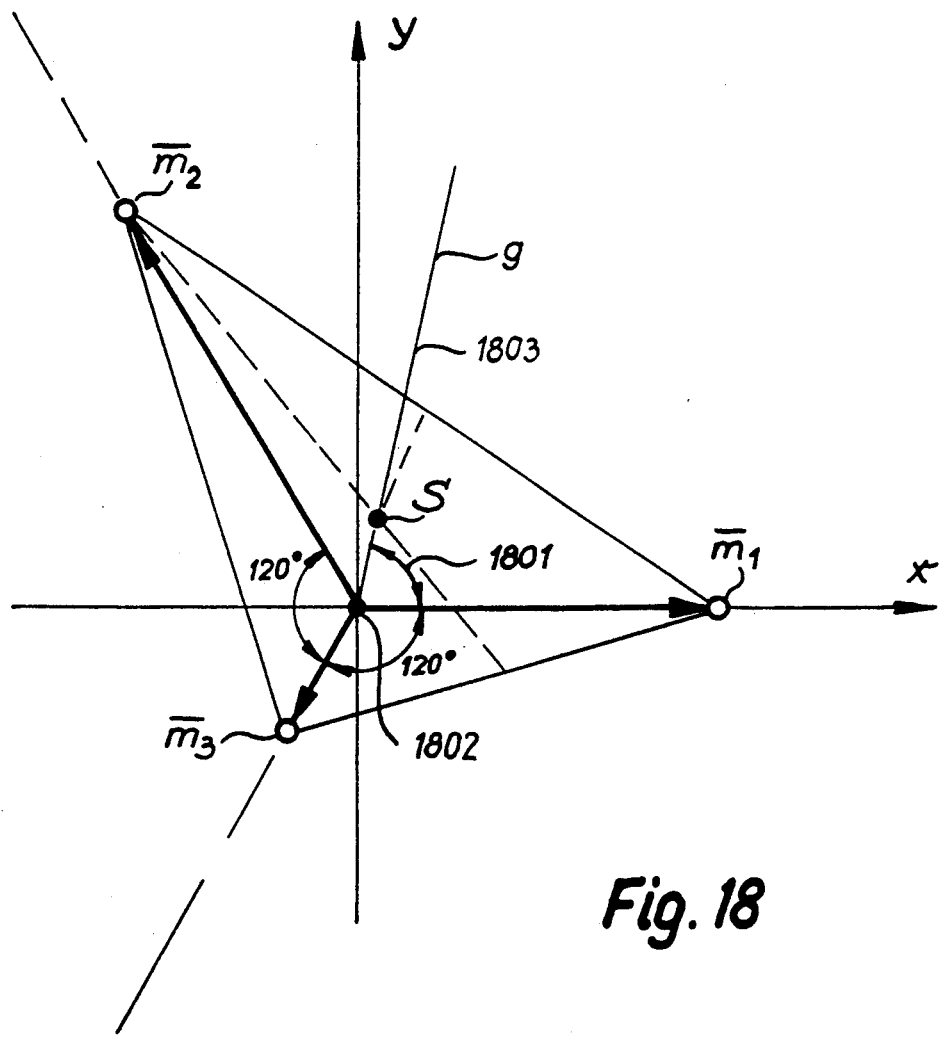
FIG. 18 The bidimensionally oriented representation of a measurement result with three individual measurements and the evaluation thereof.

In place of the three-dimensional representation form, said three measured values can also be evaluated in a bidimensionally oriented representation (FIG. 18). For this purpose the three axes of space are projected onto three lines, which emanate from the origin of an x-y coordinate system and in each case have an angle difference of 120°. Starting from the origin, distances are plotted in the direction of these axes and are proportional to the mean values m1, m2, m3. In this way a triangle is spanned, whose centroid S does not necessarily coincide with the origin 1802 of the three lines. In known manner, this centroid can be constructed by drawing or mathematically. As a function of the shape and position of the generated triangle, a line between the centroid S and the origin of the three axes will assume a different angle 1801 with respect to one of these three axes.

For determining the position of the rotor of an electric motor use is directly made of this angle. The distance between the centroid and the origin only plays a minor part and can optionally be used for correcting the rotor position determination.

The position of the centroid can be determined in known manner by construction of the median or alternatively using the centroid formula, which must here be applied e.g. to three equal-weight elements m1, m2 and m3. According to this calculating rule the portions in the X and Y direction (FIG. 18) can be separately calculated.

A closer consideration of this process reveals the identity of the calculating form with a further process.

As in FIG. 18 only the angular position 1801 of the centroid S with respect to a line 1803 emanating from the origin 1802 is sought, in the case of the mathematical determination of the centroid there is no need for the otherwise necessary division, in this case by three, so that for determining a X component of the centroid direction it is merely sufficient to add the X values of the angle points of this triangle, which also applies with respect to the Y values thereof. Put differently, this means that the vectors m1, m2 and m3, passing from the center 1802 to the angles of the triangle, must be added up and that the resulting vector of the vector sum indicates the direction which substantially coincides with the sought electrical rotor position.

In addition, the aforementioned centroid analysis process can be looked upon as a special case for all processes based on Fourier analyses and transformations. Also in the case of such analyses and transformations a corresponding vector summation is carried out for the values for the amplitude and phase of the first harmonic of a function defined by several interpolation nodes.

Figure 13:
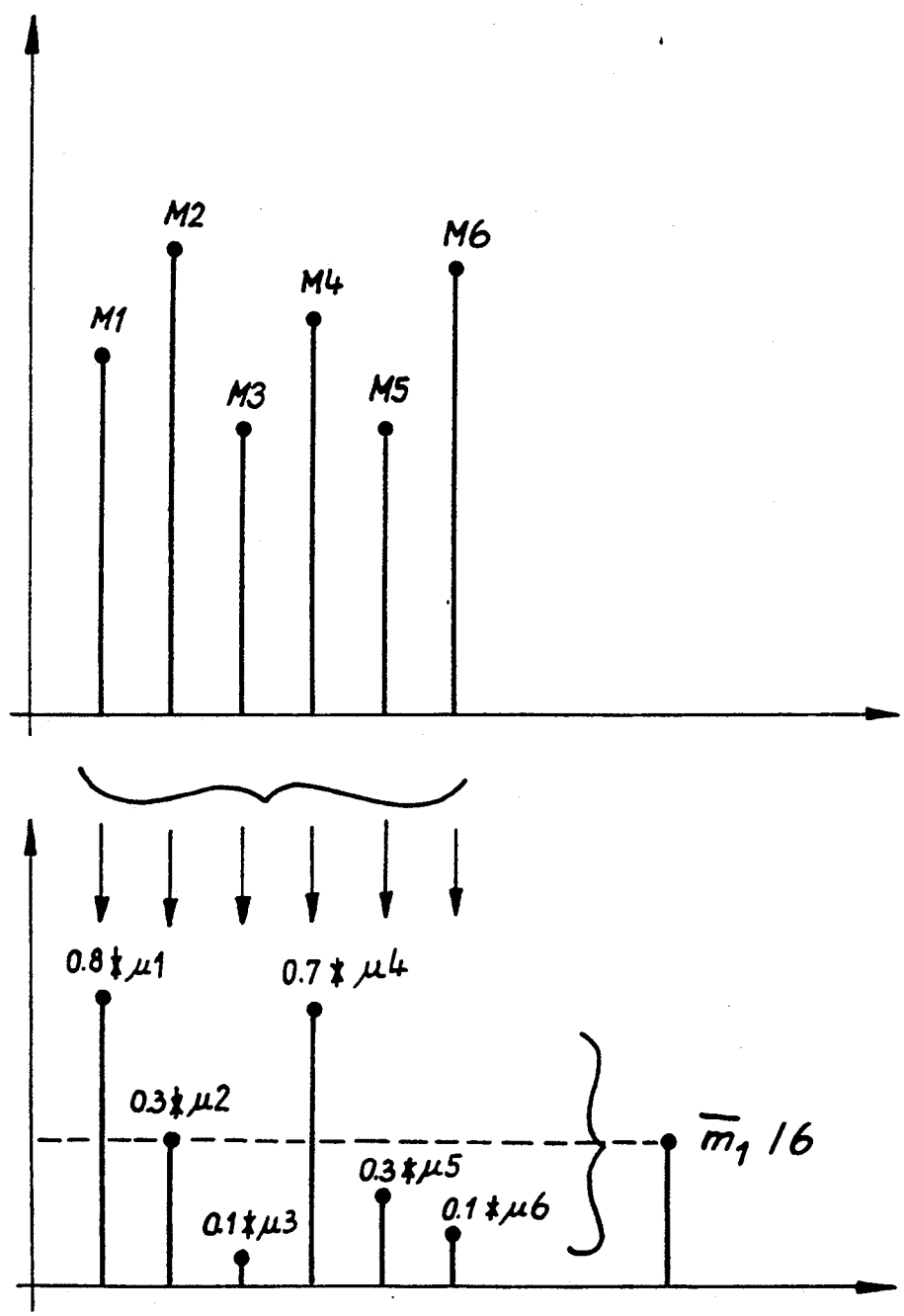
FIG. 13 The derivation of a mean value from several measurements.
Figure 20:
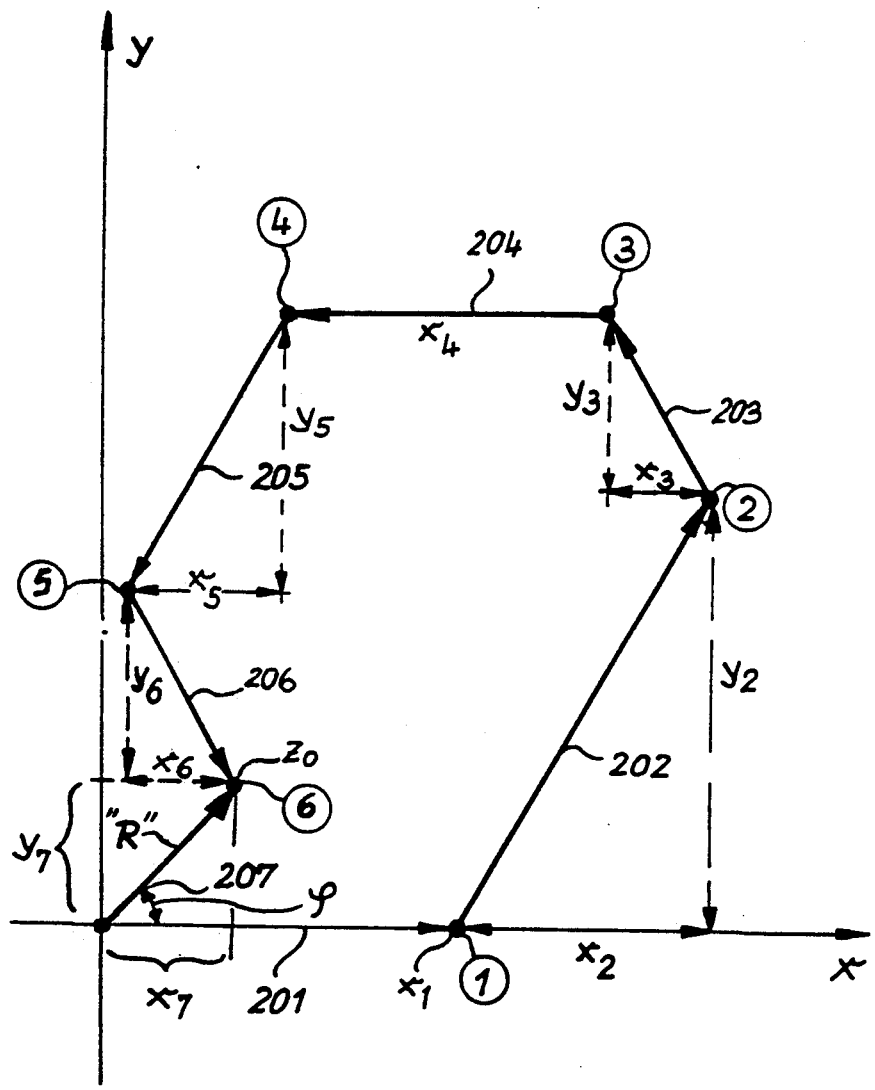
FIG. 20 The representation of a vector sum, calculated according to the above calculating specification of FIG. 19D.

Together with FIG. 20, FIG. 19D shows a corresponding example for the evaluation of e.g. three or six stator coils, for which the six values m1 to m6 are to be determined in accordance with the procedures represented in FIGS. 12 and 13. As explained, m1=M1, m2=M21, m3=M31, etc. FIG. 19D shows the "complex plane", in which the x axis corresponds to the real part and the y axis to the imaginary part. FIG. 20 can also be looked upon as a complex plane.

Apart from the coordinates of the complex plane, FIG. 19D shows all six vectors v1 to v6 of the sixth unit cubes, the latter being understood to mean a solution x, which fulfils the set problem x high n=1.

The first harmonic, i.e. the sinusoidal fundamental wave, which is associated with a predetermined number of measured values of a periodic function, is calculated in amplitude and phase by the addition of associated complex numbers. This addition is carried out in much the same way as the addition of vectors and is e.g. represented in FIG. 20 for a so-called 6-point DFT (discreet Fourier transformation). If there are fewer or more measured values (measurement points), correspondingly modified procedures apply, as are known from the theory of Fourier transformations.

In a first calculating step of said procedure firstly the measured values, which are generally present as real quantities, e.g. as measured current values, are to be converted into the correct complex numbers, as is illustrated in FIG. 19D.

If there are e.g. six values m1 to m6, then on the unit circle in the complex plane firstly the six so-called sixth unit cubes v1, v2, v3, v4, v5, v6 are plotted, for which the equation $(v_k) 6=1$ is fulfilled, in which k=1, 2, 3, 4, 5, 6. The angle phi o shown in FIG. 19D is 60°, so that said unit cubes can also be represented according to the formula exp(k * i * phi o), in which k has a value of 1 to 6. In a further step for the six values m1 to m6 a linear stretching of the unit cubes takes place in a successive order and in each case by the particular factor m1 to m6, so that the points m1 to m6 of FIG. 19D are obtained in the complex plane. The vectors emanating from the coordinate origin up to the said points m1 to m6 are shown in FIG. 20, but in a different form.

The expression "stretching the unit cubes" is understood to mean that they are multiplied by the value m1 to m6. For example, in FIG. 19D the value m1 is greater than 1 and therefore the particular vector m1 is greater than 1 (from the amount standpoint). Therefore m3 is smaller than 1 and the particular vector m3 becomes smaller than 1. The vectors m1, m2, m3, m4, m5, m6 are given the reference numerals 201 to 206 in FIG. 20. To illustrate their vector sum they are also strung together in chain-like manner.

In order to illustrate the associated calculating rule for the arithmetic summation of these vectors their x and y parts are shown and designated x1, x2, y2, x3, y3 etc. The x component of the resulting vector is designated x7 and is formed from the x parts shown, whilst the y component is formed from the y parts and is designated y7. The resulting vector has the end point Z 0, which can once again be looked upon as a complex number with the real part x7 and the imaginary part y7. The amount R and the phase phi of said complex number can be determined according to known calculation rules from the real part and the imaginary part, e.g. the amount of R is equal to the square root of the sum of the squares of the real part and the imaginary part, i.e.

$$\sqrt{(x_7^2 + y_7^2)} \ .$$

An associated calculating rule for the processing of the values m1 to m6 by a digital computer, e.g. a microprocessor, is given as a flow diagram in FIG. 21. As is conventional with such processes, numerous other procedures are possible.

In a first step S40 are known values m1 to m6 determined by another program part are filed in a memory, e.g. a stack memory. In the following steps S41 and S42 different quantities are given initial values and in particular the storage locations with the allocation addresses SUM_R and SUM_I are set to zero and form the memories for the real and imaginary parts. In the following steps S43 to S58 values are added or subtracted in these memories, being derived from the values m1 to m6. Thus, in step S43 and S44 initially the value m1 is retrieved from the stack memory and then added to the content of the memory SUM_R, which then assumes the value m1.

In step S45 the value m2 is obtained from the stack memory and is divided by two. This result is added to the content of the memory SUM_R and multiplied by the factor $\sqrt{3}$ and then added to the content of the memory SUM_I. This process is carried out in similar form in the following steps and in steps S51 and S52 the division by the factor two is omitted and the procedure is much as in steps S43 and S44, but m4 must be subtracted from the content of the memory SUM_R. In the other cases it is firstly necessary to carry out a division by two in order to obtain subtitles, which are subtractively or additively added to the memory SUM_R, or to the memory SUM_I following multiplication by the factor $\sqrt{3}$. This totalling up or down of the memories SUM_R, SUM_I are then concluded with the step S58.

The values in memories SUM_R and SUM_I consequently represent the x component x7 of the vector R in FIG. 20 and also the y component y7 of the same vector.

The further calculating steps of FIG. 21 are intended to determine the angle of this vector relative to the x axis and also its amount. According to steps S59 to S64 of FIG. 21 for determining the amount initially the contents of the memories SUM_R and SUM_I are individually squared and then from the squares is formed the sum. From this sum is drawn the square root and this value represents the sought amount of the vector and is therefore stored in the storage location designated BETRAG or amount. For calculating the phase angle phi relative to the x axis, in steps S65 to S68 firstly the contents of the memories SUM_R and SUM_I are obtained and the sign of these values is noted. In accordance with known trigonometric procedures the sought main angle value phi is calculated from the quotient of SUM_I/SUM_R and the arc tan function used thereon. The final angular value is then determined in accordance with known transformations on the basis of the stored sign values within a range 0° to 360°.

The above facts can also be described in shortened form by the summation formula $$Z_o = \epsilon m_k * exp(i * k * phi_o)$$

and the sum $Z_o$ consequently gives through its real and imaginary parts the amount and phase of the first harmonic or fundamental wave, i.e. the fundamental wave of a periodic function defined by the measured values m1 to m6.

The last-described process can be compared with calculation procedures and processes of discreet Fourier transformation (DFT).

This is illustrated by FIG. 21A, where at A) are shown the values m1 to m6 in the form of 6 interpolation nodes of a periodic function 230, which are subsequently repeated. Comparison shows that the last-described process can be looked upon as DFT for the determination of the amount R and phase phi o of the first harmonic of this function 230, which is also defined by equidistant interpolation nodes and which are repeated outside the interpolation nodes in periodic manner, i.e. continued in the same form.

FIG. 21A shows at B) the determined first harmonic with its amplitude R and its phase angle phi o, which essentially gives the rotor position and which is e.g. calculated according to the flow diagram of FIG. 21.

As has already been stated, the angle or phase phi of this first harmonic graphically represented in FIGS. 20 and 21A and calculatable according to FIG. 21 is of interest and represents the sought position characteristic for the motor rotor position.

It is obvious that in place of the indicated example similar mathematical procedures can be used, as are known from the theory of Fourier transformations and in general integral transformations. In particular in the case of a larger number of interpolation nodes, it is possible to use a related algorithm, which is known as fast Fourier transformation (FFT) and is suitably for saving mathematical effort. As a function of the process, it may be necessary to respect restricting conditions, which are well known to the Expert in this field.

On comparing the described process for determining the sought phase position of a function, it becomes clear that the processes based on integral transformations or on centroid analyses are characterized by a significant mathematical or calculating time saving. For a simple determination of the position of a rotor, the amount of R is not required (FIG. 20 or S64, FIG. 21).

A check on this value regarding the exceeding of previously determined upper and lower limits, can be used to establish whether there is an overall plausible calculating or mathematical result for the determination of the angle phi or whether it is necessary to assume any type of error influence. If the latter need not be feared, the amount can also be used for correction during the determination of the rotor position, as explained hereinafter.

Figure 23:
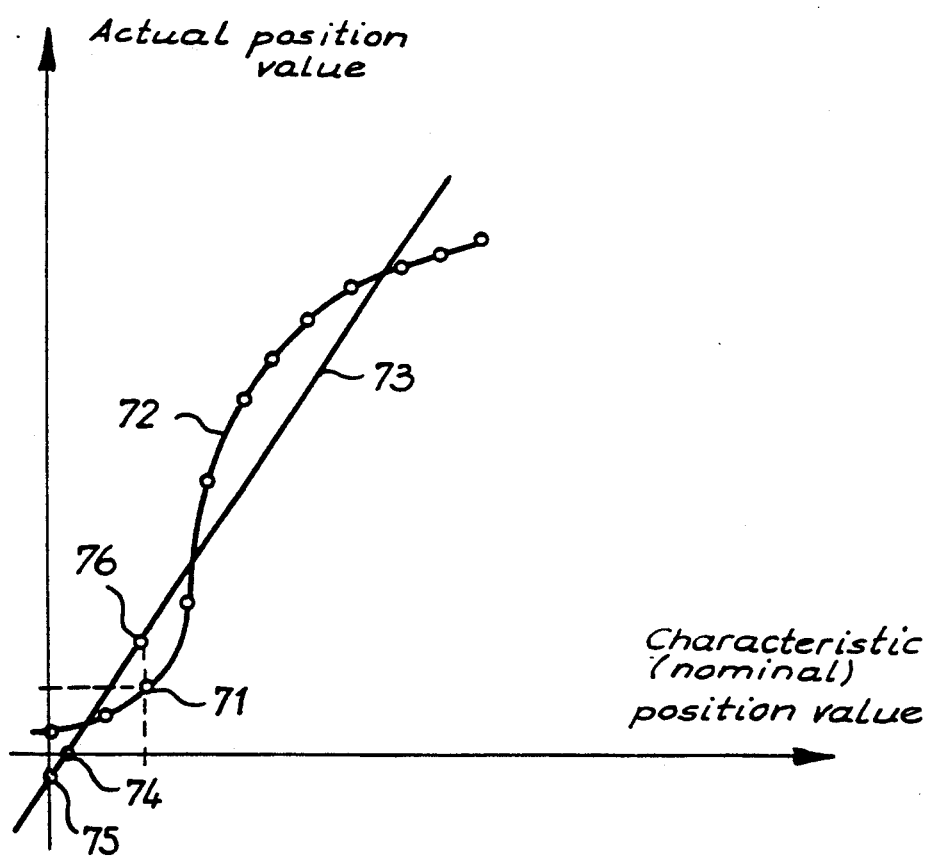
FIG. 23 The path of a correction function for the association of an actual value with a characteristic value of the rotor position.

For the precise determination of the position of the rotor with relative errors in the percentage range a substantially linear association or connection is necessary between the actual angle or position of the rotor and the calculated angle or position value. As the measurement is based from the standpoint of its principle on non-linear physical effects, the initially attainable results are usually not linear and can therefore only be referred to as position characteristics. According to the inventive idea it is advantageous by means of a table previously determined in an experiment to utilize correction values, which can be also plotted in a diagram or graph, as shown in FIG. 23.

The latter shows the cartesian coordinates "position actual value" and "position characteristic value". The functional association of the actual and characteristic values is given by the assignment curve 72, as shown by the example of the abscissa and ordinate values of the function value 71. The assignment curve 72 generally does not have a linear path and consequently differs from a straight line 73 with optimum matching to the function values. The deviations of individual interpolation nodes of the function 72, represented on the example of the paths 71 to 76, can be kept in a correction table. According to a known mathematical process, one or more matching lines can be implied through a number of interpolation nodes.

For defining a matching line 73, which need not necessarily be characterized by a best matching to the interpolation nodes, as is known it is sufficient to have the coordinate intersections 74 and 75.

For each position value determined according to one of the already indicated processes, it is possible to calculate an actual position value using such a correction table and conventional interpolation processes. In place of a correction table, it is possible to give for different motor types a correction formula, which is defined by one or more sine terms and optionally associated phase terms.

In practice, maximum correction values of a few to a few dozen degrees el can occur. A typical value represents a sinusoidally varying deviation, which assumes a maximum of approximately 20° el and which can be reduced approximately by a factor of 10 by the indicated correction calculation.

In a further refinement of the correction measures it is naturally also possible to introduce further parameters into the calculations, such as e.g. temperature values of the motor coils or the magnet.

Additional correction information can be determined from the previously not considered higher harmonics of the fundamental measured value sequences, provided that correspondingly large numbers of measurement points are available.

In addition, a further correction function of this type can be derived from the amplitude of the first harmonic. An additional correction function or table is required for this procedure and the sought rotor position is then calculated from the angle phi (FIG. 20) and an additive or multiplicative correction value, which is directly dependent on the amount (amplitude) of the first harmonic. Correction functions or tables are to be fixed by an experiment carried out beforehand.

Figure 24:
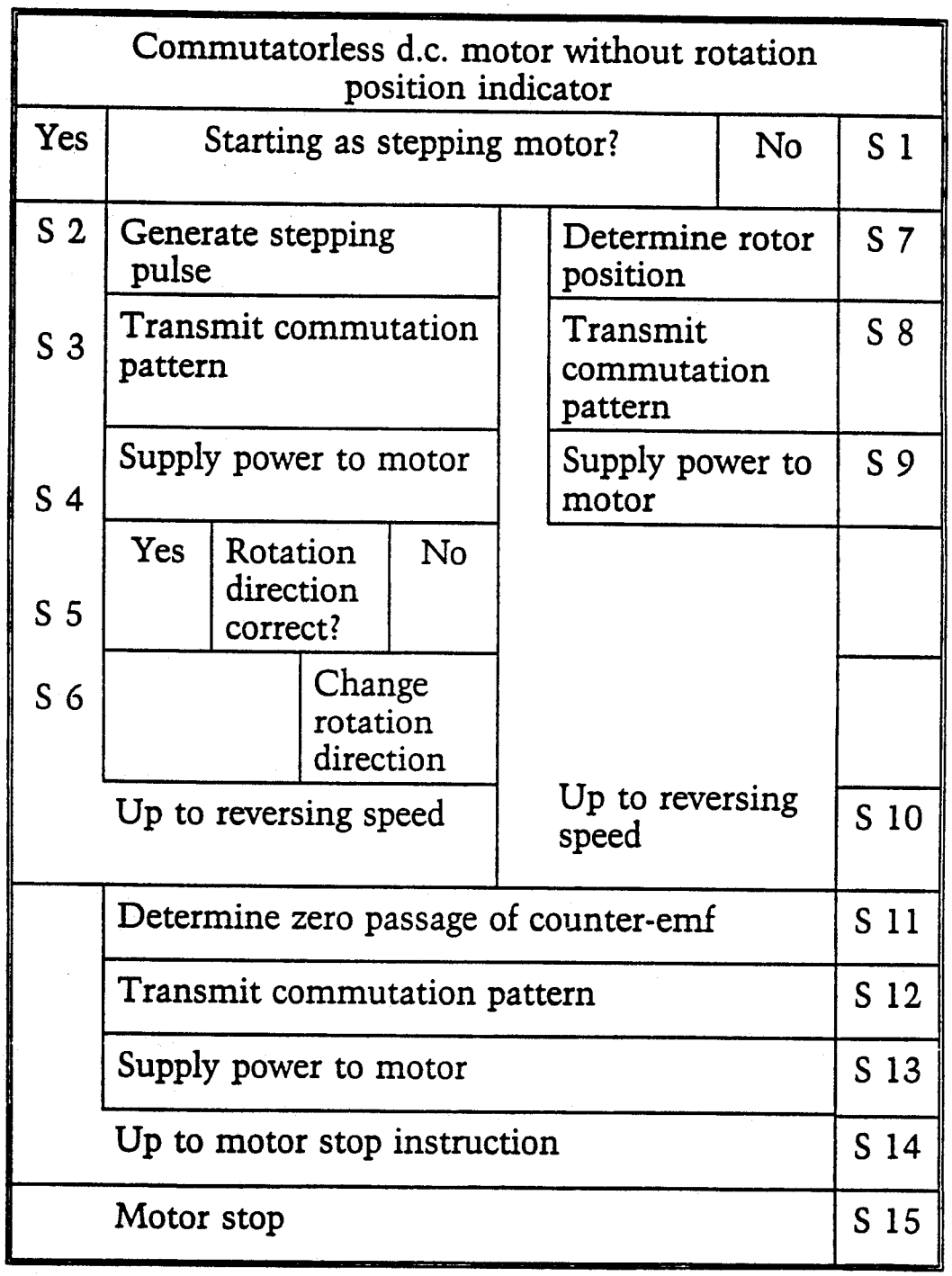
FIG. 24 A flow diagram for the current application to a motor or position sensor.

With respect to the commutation strategy for sensor-free motors, the decision sequence of how the motor commutation is to be carried out, is illustrated by the flow diagram of FIG. 24.

It is firstly necessary to establish whether or not the stepping motor can be started, because the entry into a basic position can take place by an inadmissible rotation direction (FIG. 24, S1). If stepping motor operation is permitted, then e.g. a stepping pulse is supplied (FIG. 24, S2), which increments the counter 1003 (FIG. 2). In step S3 the commutation logic 1002 produces a new commutation pattern, which is supplied to the output stage unit 26, which in a step S4 ensures the energizing of the motor. In the following step S5, it is established by emf observation whether the rotation direction is correct. If this is the case, in step S6 the rotation direction can be maintained, otherwise commutation sequences must be ensured which bring about a rotation direction change. This sequence is initially repeated until a first speed limit is reached. If alternatively the motor start in the correct rotation direction is immediately necessary, steps S7 to S9 are performed. Thus, by the rotor position determined in step S7, as is also the case in the regular operation of a commutatorless d.c. motor, it is possible in one step S8 to generate and emit the necessary correction pattern, which brings the motor into the correct rotation during the step S9. A decision is made in the step S10 as to whether this process must be repeated or whether a speed limit has been reached.

On reaching this first speed limit, through steps S11 to S14 a further motor acceleration is ensured. This is achieved in that after detecting the zero passages of the motor counter-emf, at an appropriate time and in accordance with a new-calculated commutation pattern, power is supplied to the motor. In this way the motor is run to the maximum attainable speed.

The motor speed or position is regulated or controlled according to the inventive process in the following way. The precise determination of the position of a rotor using the inventive process can be performed with a sufficiently high repetition frequency, e.g. 100 times per second, in order to record deviations from a desired motor rotor position and to keep same as small as possible by an active counteraction (control principle).

As the position values can only be determined at discreet times, said control may only be a scanning control. Numerous publications are known in this field.

For scanning controls the attainable control quantity is influenced by the scanning time and also the different system time constants, as well as by the control algorithm used.

It is therefore a further object of the invention to use the position determination of the rotor according to one of the indicated processes in order to either carry out a speed or a position control of the rotor. Preferably use is made of a controller structure with PID algorithm or also a state controller algorithm.

For control purposes it is also possible to previously provide a program or externally preset the course of the speed or sequence of positions to be assumed by the motor rotor as a function of time.

Another inventive process for controlling the speed comprises only carrying out one rotor position measurement and then carrying out the current application steps. The duration of the latter will generally depend on when the next motor commutation is to be carried out and will constantly decrease on accelerating the motor.

According to the inventive idea an advantageous process when calculating the necessary pulse shortening is to take account of the number of already performed current application cycles. Generally, with increasing rotor speed, the pulses are shortened.

In place of the dependence of the pulse shortening on a number of current application pulses as an implicit measure of the time, such a dependence can also be linear and explicitly dependent on time.

Figure 25:
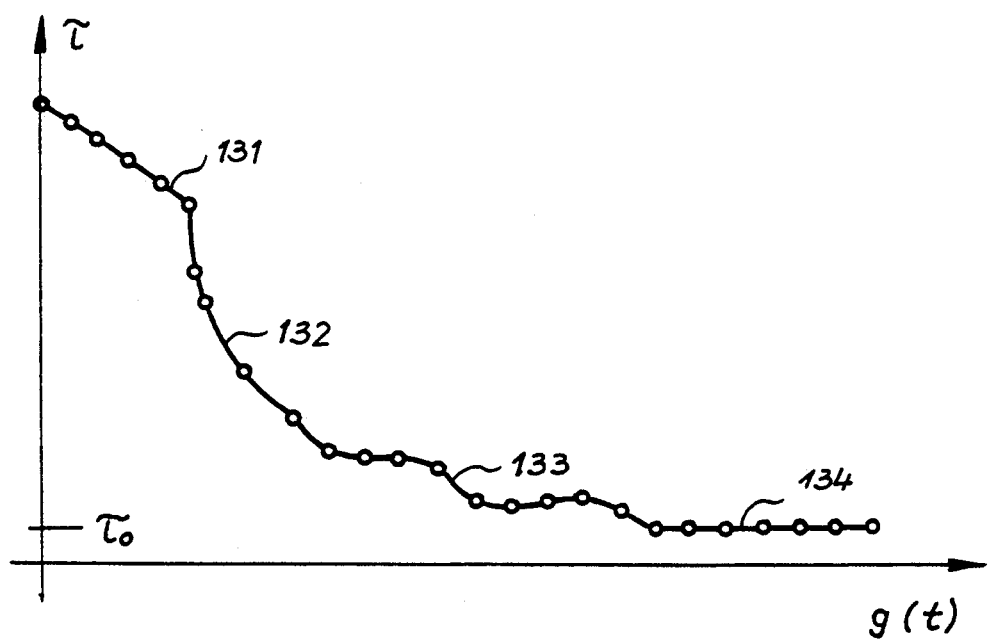
FIG. 25 A diagram of the different possibilities for controlling the start.

According to the invention, according to FIG. 25 another possibility consists of making the current application period duration linearly dependent on the obtained overall angle or position, e.g. (starting with a relatively large value for the current application time), in accordance with the already attained position, the current application time is continuously and linearly (131) reduced, up to e.g. a minimum value, below which no further drop must take place.

It is also possible to perform these procedures in non-linear form. This can in particular be brought about in the form of a logarithmic or a hyperbolic dependence (132). If necessary, more complicated functional dependencies can be used.

As a function of the motor type and the coupled load, particularly with a resiliently coupled load, it can be advantageous to reduce the current application (tau) according to a tabulated dependence (FIG. 25, 133), i.e. the necessary current application times are no longer calculated on the basis of a mathematical expression, but are instead filed in table form, e.g. in a memory component. With increasing rotor angle or time, in each case new current application time information is obtained from the memory component. This process is performed until a minimum current application time is reached, which is kept constant, so that no further accesses to the memory component are needed (FIG. 25, value 134). The above-described process is shown in the form of a structogram in FIG. 26.

Beginning with a starting step S20, in which there is in particular an initial allocation of initial values to variable memory values, in step S21 a time counter is set to zero and then periodically increments its count automatically and in quasi-continuous manner, i.e. with a predetermined short cycle time.

With the aid of the previously described processes, in the following step S22 and without the aid of external sensors, at least the electrical position is determined. The following steps relate to the running-up phase, in which the kinetic energy of the motor constantly increases. As a function of the already determined position value, in step S23 a suitable commutation signal is generated and is used in step S24 for motor current application, in such a way that the rotor acceleration takes place in the desired direction. However, the current is initially not interrupted.

Immediately thereafter in step S25 the actual time t is determined, by means of which in the next step S26 the provided current application time tau is determined according to a predetermined calculation rule or according to a predetermined table stored in the processor. Waiting takes place in the next step S27 until the current application time determined in step S26 has elapsed, so that in step S28 the motor current can initially be switched off.

As the acceleration phase only lasts for a certain time, a check is carried out in step S29 to establish whether the provided acceleration time t LIM has been exceeded or not. If this is not the case, a continuation occurs with step S23 and so on. However, if the time t LIM has been exceeded, then the program is branched into the constant speed phase and a further commutation signal is supplied in step S30. This step is followed by the step S31 which, as a result of the generated commutation signal, ensures the associated correct current application to the motor.

In the following step S32, waiting takes place in the same way as in step S27 to establish if the motor current is to be temporarily switched out again, which is possible after a time corresponding to tau o time units, the constant quantity tau o being known to the processor.

The temporary disconnection then takes place in step S33. A check is made in the following step S34 to establish whether any condition has led to the generation of a stop signal. If this is not the case, there is again branching to step S30, in which a new commutation signal is supplied, etc. If this is not the case, i.e. when a stop signal is present, branching takes place to the end of the program, i.e. step S35. No further motor currenet is supplied and the motor stops.

In the case of a speed control it is also possible in forced manner to carry out a change of the position determination mode from static, i.e. at low speeds and per determination of the phase position of a fundamental wave, to dynamic procedure by means of counter-emf or vice versa. According to the invention, this change can take place directly after a predetermined number of current application cycles.

The prerequisite for the last-mentioned operating procedures is naturally that there are adequate known and reproducible friction ratios and moments of inertia of the motor and the equipment driven by the latter, so that there can be no premature change and the dynamic position determination mode can function in error-free manner.

Figure 6:
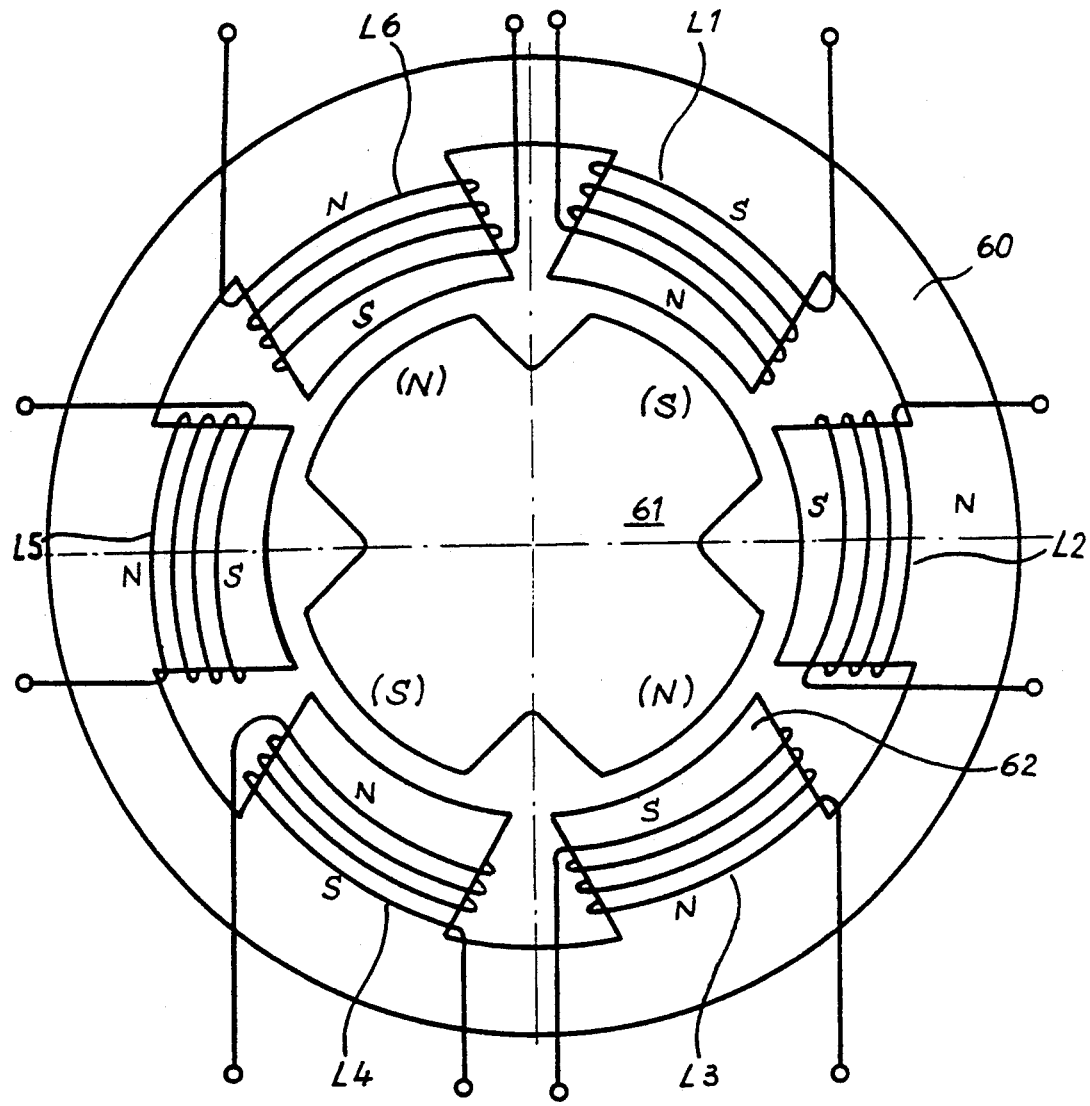
FIG. 6 The diagrammatic construction of a reluctance motor with six coils and a rotor with quad symmetry.
Figure 7:
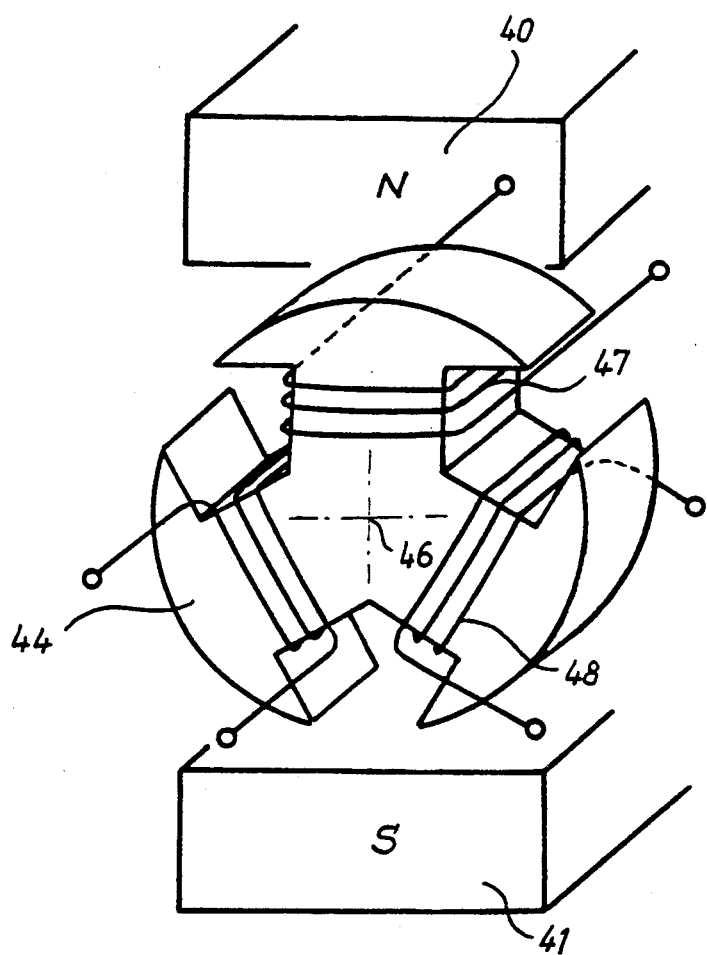
FIG. 7 A 3-T-armature with three coils and two magnetic poles.
Figure 8:
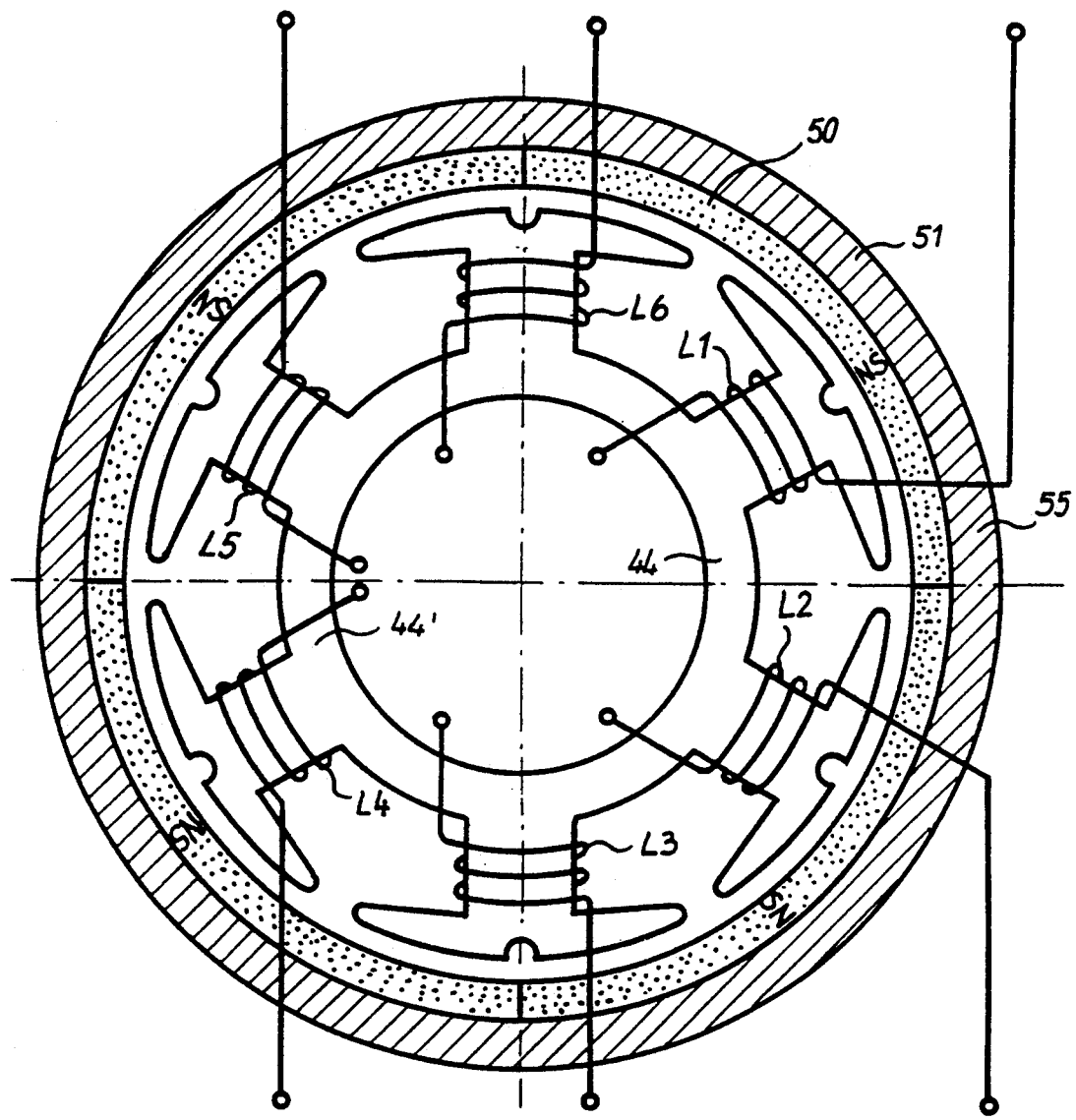
FIG. 8 A stator of an external rotor-type motor with stator plates and stator phases.
Figure 9:
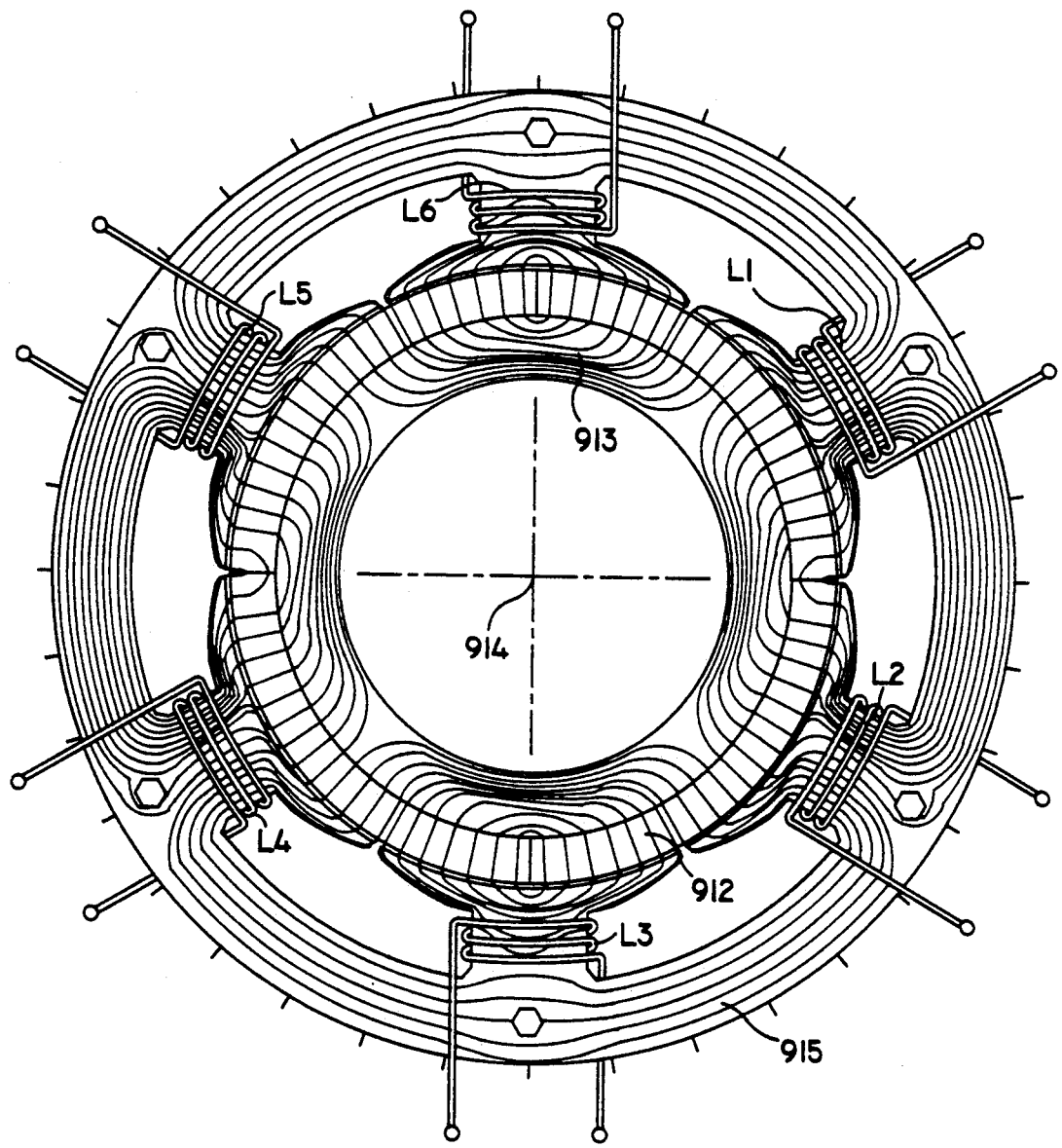
FIG. 9 The field pattern of an internal rotor-type motor with four poles and six stator phases.
Figure 10:
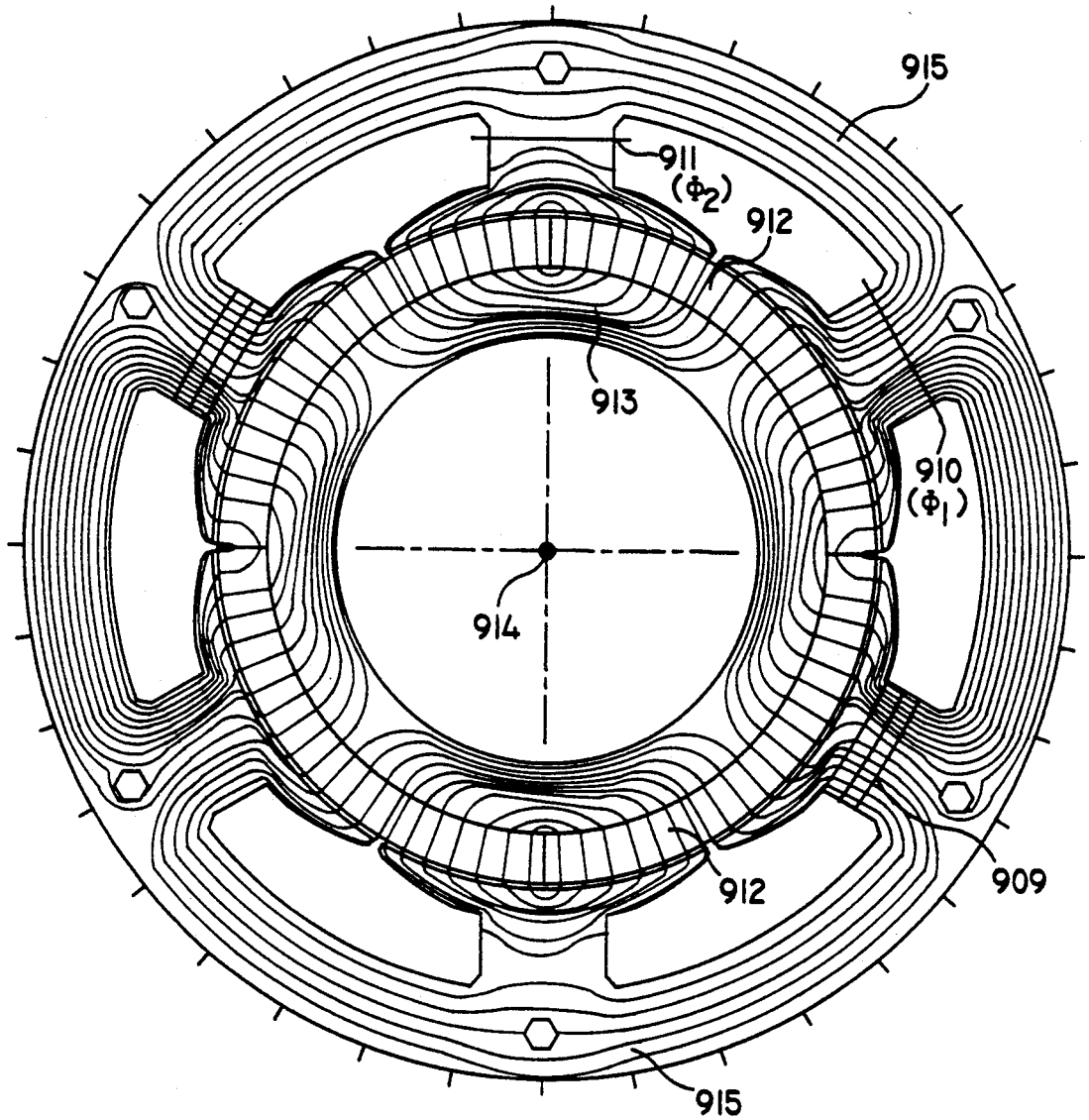
FIG. 10 The motor according to FIG. 9 for illustrating the magnetic flux in different stator elements.

The use of the invention is not restricted to standard commutatorless d.c. motors, such as are preferably used with 4 or 8 magnetic poles and e.g. 6 or 12 coils (FIGS. 8, 9 and 10). It is also possible to extend the embodiment to all motors, whose inductance varies in position-dependent manner, e.g. simple motors with so-called 3-T-armatures (FIGS. 4, 5 and 7) and in particular all types of reluctance motors with or without permanent magnets (FIG. 6).

Figure 4:
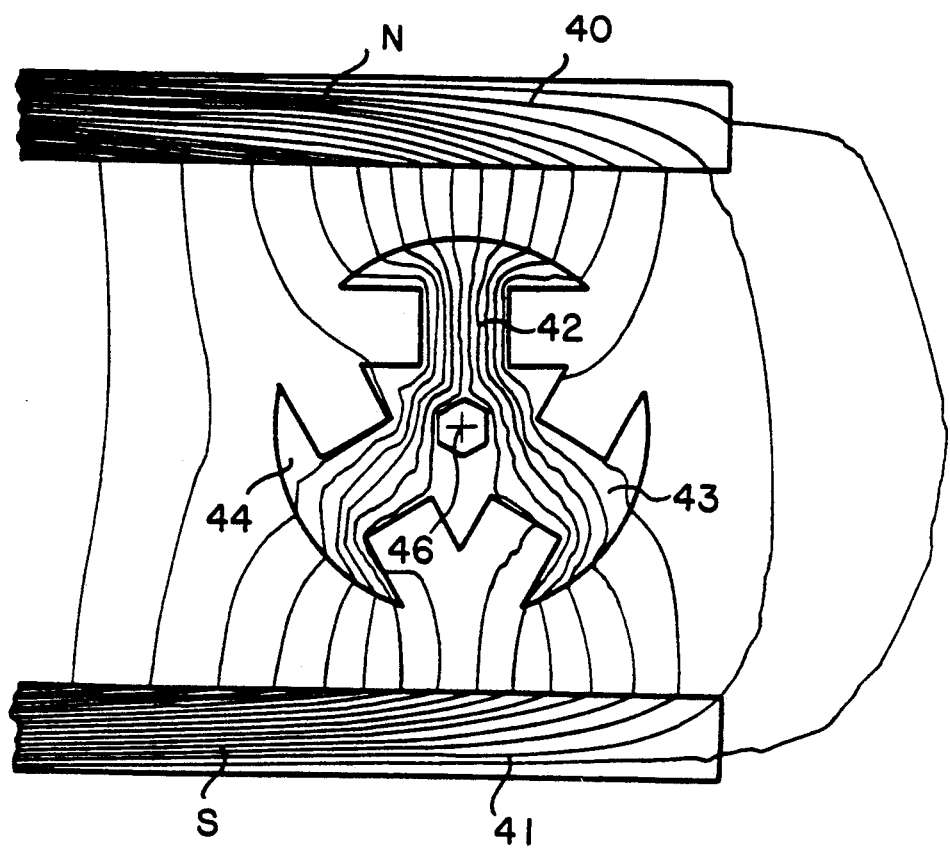
FIG. 4 The field pattern for a d.c. motor in no-load operation.
Figure 5:
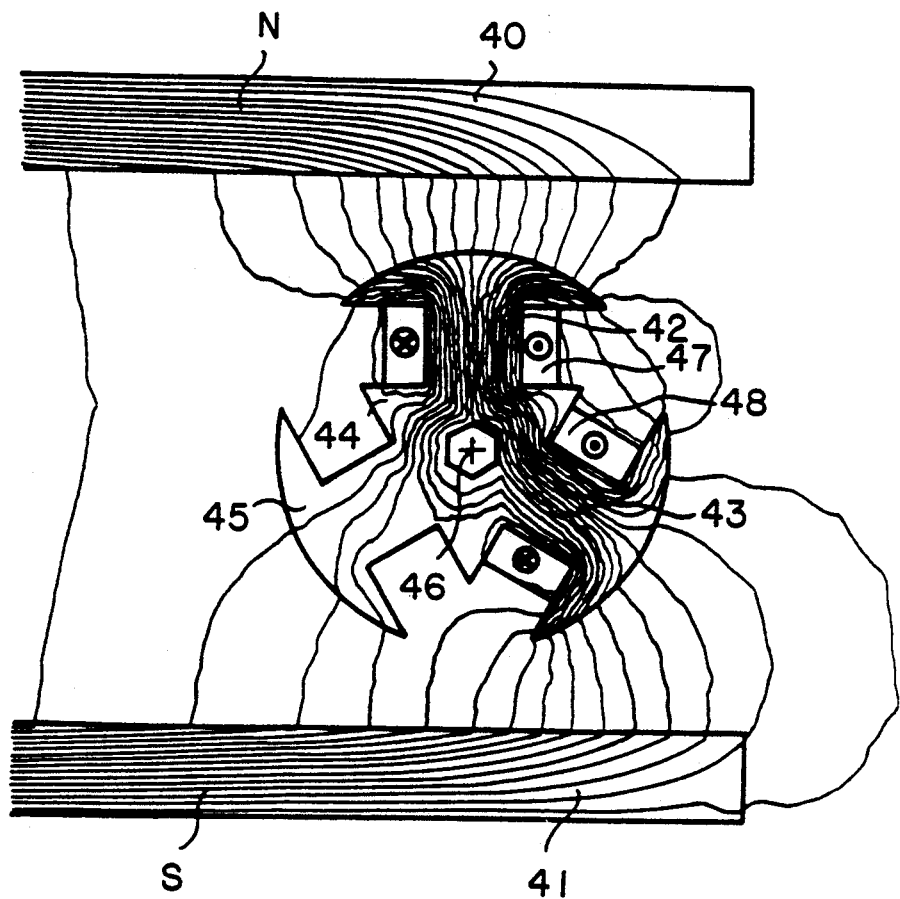
FIG. 5 The field pattern of a d.c. motor when current is applied.

The magnetic conditions are more particularly shown in FIGS. 4 and 5. FIG. 4 firstly shows a conventional 3-T-armature 44, which is located in the magnetic field of a permanent magnetic pole pair with north pole 40 and south pole 41 and which is rotatable about the centre 46. In the currentless case (FIG. 4) the leg, which is nearer to the north pole 40 than the legs 43 and 44 to the south pole 41, is exposed to a higher magnetic flux density (10 flux lines) than the two other legs (approximately 5 flux lines).

It is clear that a coil 47, as shown in FIG. 5, increases the magnetization of leg 42 when current flows through and an iron part of said leg can be saturated with less current than if no premagnetization existed or only existed to a slight extent through the permanent magnets 40, 41, as is the case with leg 43 in FIG. 5. However, correspondingly a higher current application to such a coil 47 is required, in order to achieve a magnetic saturation of the leg 42 in the opposite direction. As current application processes of this type are subject to a first time constant due to the initial inductance present, the time required for magnetization up to saturation with a desired polarity will differ.

Similar considerations apply in the case of current application in a series connection of coils 47 and 48. As a function of the current polarity, in particular leg 42 will be saturated more slowly or rapidly, which also leads to a change to the effective inductance of this coil. It is clear that these effects can have a different action as a function of the angular position of the armature 44, but according to the rotational symmetry of the armature, following a rotation of 120° mech, will be repeated for the next coil.

FIG. 7 shows a simple spatial arrangement of such a 3-T-armature motor. The contacting of the coils 47 and 48 can take place directly with the armature 44 stationary and the magnets 40, 41 rotating. In the case of fixed magnets and rotating armature, the coils are appropriately supplied with current via slip rings (not shown in FIG. 7).

A similar action can be obtained with the arrangement according to FIG. 6 (reluctance motor). A dynamo iron stator 60 with six distinct stator poles 62 acts on a movable rotor 61, which can also be made entirely from iron.

On the stator pole 62 there are coils L1 to L6, which can be supplied with d.c. voltage of random polarity. As the rotor 61 is firstly non-magnetic, comparable conditions to those of FIG. 4 can be produced, in that the coils L1 and L4 are connected in such a way that the indicated south poles of the rotor 61 are obtained. The simultaneously obtained north poles of the rotor with the south poles produced by the same magnetization process then face those stator poles on which the coils L2 and L3 or L5 and L6 are located.

The iron cores of these coils are consequently also premagnetized and consequently influence the current path through these coils, if they are supplied with short test pulses for position measurement purposes. Such test pulses can naturally also be of different electrical polarity and it is also possible to use coil combinations as premagnetization devices, particularly in series and parallel connection.

A similar configuration to FIG. 7 is shown in FIG. 8, but in which a fixed armature 44' has twice as many stator poles, which are provided with associated coils L1 to L6. The number of permanent magnetic poles of the rotor 55 is also doubled in FIG. 8 and the said poles of the magnet 50 are interconnected in interruption-free manner. This magnet is held by an iron yoke 51, which simultaneously leads to an improvement of the magnetic circuit.

A comparable arrangement with rotating, but internal magnets (internal rotors) is shown in FIGS. 9 and 10, which additionally illustrate the magnetic conditions under no-load conditions of the motor. The stator 915 also has six distinct poles with in each case associated coils L1 to L6. The magnets 912 of the rotor are located on an iron yoke 913 and can rotate about the centre 914.

The stator poles with the coils L1, L2, L4 and L5 detect the full magnetic flux of the permanent magnets 912. They can consequently be easily saturated by additional current application to the said coils than is possible with current application to coil L3 or L6 in the represented rotor position. This is illustrated by the section lines 910 and 911 in FIG. 10. As can be seen the magnetic flux Phi 1 is represented by a larger number of magnetic flux lines, which cross the section line 910, whereas there is no significant magnetic flux (Phi 2) at the section line 911.

Naturally, these conditions are also dependent on the angular position of the rotor, as shown in FIG. 11A, where the rotor is further rotated clockwise by a few degrees compared with FIG. 10.

Whereas the flux through the section line 910 has not significantly changed, the flux through the section line 909 has been significantly reduced. Therefore the associated coil L2 (FIG. 9) must be supplied with more current to bring about a magnetic saturation in this stator pole.

A corresponding embodiment of a rotor with four magnetic poles 501 to 504 is shown in FIG. 11C. Poles 501 and 502 are more strongly magnetized than poles 503 and 504. Those stator poles which face the magnetic poles 501 and 502 consequently receive a higher premagnetization and can consequently be brought into magnetic saturation in an easier manner, i.e. with less current.

However, if said premagnetization has to be overcome by oppositely acting current application, naturally higher currents must be used than with those stator coils which face the permanent magnetic poles 503 and 504.

As a result of this asymmetry in the magnetization having a periodicity of 360°, clear conclusions can be drawn regarding the rotor position over the entire mechanical full angle of 360°.

A surface structure of the rotating permanent magnet, as shown in FIG. 11B, has a set back surface 116 on one or more poles, e.g. the north pole 117.

As a result of this geometrical asymmetry, an asymmetry is also produced in the magnetic flux, so that as a result of this asymmetry it is possible to clearly determine the rotor position over the entire mechanical angle.

Similar facts are illustrated by FIG. 11D. The permanent magnet with the north pole 1123 and south pole 1124 is rotatable about the centre 1127 and faces the stator poles 1126 of the stator 1125. The air gap 1122 is larger than the air gap 1121 and other, not shown air gaps, as in the aforementioned case, in this way a mechanical/magnetic asymmetry is produced, which allows a clear determination of the rotor position over the full mechanical angle.

We claim:

1. Apparatus for controlling a brushless electric motor having motor coils, the apparatus comprising:
    a power stage having a plurality of switching means, and output terminals for supplying power to the motor coils of a motor to be controlled; and
    control means coupled to the power stage and arranged to apply commutation signals to the power stage to selectively switch said switching means whereby power is selectively applied to said motor by way of said switching means, and wherein the control means is arranged to receive sequence of samples of a component of the power fed to the motor, the control means further comprising means for determining parameters of a function depending on variable inductance in the motor and defined by the sequence of samples, including means for performing a vector addition or a complex number addition for each set of a plurality of the samples, wherein the parameter determining means operates repeatedly for multiple successive applications of power to the motor and from the parameters determines position-dependent and/or inductance-dependent electrical motor values.

2. The apparatus according to claim 1, wherein the parameter determining means includes means for determining parameters of inductance of at least one motor winding as position dependent electrical motor values.

3. The apparatus according to claim 2, further including a rotor and a magnetic circuit in the motor affected by and affecting the at least one motor winding, the magnetic circuit being of a type to approach magnetic saturation during a rotor movement of 360° el.

4. The apparatus according to claim 2 or claim 3, wherein the motor comprises a plurality of permanent magnets having pole faces that have magnetic fluxes that vary sufficiently across the pole faces to provide rotor-position-dependent variations of inductance of the at least one motor winding.

5. The apparatus according to claim 2 or claim 3, wherein a preliminary current is supplied to the one winding to produce a pre-magnetization state.

6. The apparatus according to claim 2 or claim 3, wherein the current path to the one winding is arranged to facilitate the determination of the inductance of the one winding.

7. The apparatus according to claim 2 or claim 3, wherein the control means including means for determining the parameters of inductances of at least two windings as functions of rotor position, determining a combined function of the inductance-rotor position functions, and electronically storing the combined function as a table of values.

8. The apparatus according to claim 7, including means for interpolating between values in the table of values to provide further values for storage in the table of values.

9. The apparatus according to claim 8, wherein the means for interpolating provides a spline interpolation.

10. The apparatus according to claim 8, wherein the means for interpolating provides an interpolation based on a sin-cos series expansion.

11. The apparatus according to claim 8, wherein the control means adjusts the application of commutation signals in response to a determination of rotor position for which the decision criterion is the similarity of functions, which functions are based on at least one of measured energization current pulses to the winding and on the function defined by the electronically stored table of values.

12. The apparatus according to claim 11, wherein the similarity of functions is based upon the method known as sum of least squares or the method known as sum of smallest absolute amounts.

13. The apparatus according to claim 2 or claim 3, wherein the position dependent electrical motor values are applied to determine rotor position, the control means including means for multiplying the individual measured current values by associated directional components thereof and adding the products on a directional basis to assist in the determination of position.

14. The apparatus according to claim 13, wherein the directional components have directions separated by so-called integral angles, which are respective ones of the angles $0=360°/n$, wherein $n=1, 2, 3$ etc.

15. The apparatus according to claim 14, wherein the addition of products on a directional basis is a vector addition.

16. The apparatus according to claim 13, wherein the control means establishes a test mode including planned, incremental movements of the rotor, and the determining and electronically storing means determines and electronically stores the associated directional components of the currents.

17. The apparatus according to claim 11, wherein the control means sets a desired rotor position, compares it with the determined rotor position to provide an error signal, and applies the error signal via proportional-integral-derivative negative feedback to reduce the error signal.

18. The apparatus according to claim 11, wherein the control means schedules a start-up mode for the motor according to a schedule in which the period duration of the applied current pulses is shortened progressively to approach a normal operating mode.

19. The apparatus according to claim 18, wherein the control means provides a linear shortening of the period duration of the applied current pulses.

20. The apparatus according to claim 13, wherein the control means, in determining rotor position, determines a phase of a fundamental oscillation of at least some of the functions, which are repeatedly determined.

21. The apparatus according to claim 20, wherein the control means determines the amplitude and phase of the fundamental oscillation by a centroid analysis.

22. The apparatus according to claim 11, wherein the control means further adjusts the application of commutation signals and the determination of rotor position based up an electronically stored table of correction values that are specific to the brushless electric motor.

23. The apparatus according to claim 11, wherein, for the application of commutation signals, the control means includes, in series toward the motor, a commutation logic unit, a commutation control unit, a current detection unit, a counter, an attenuator, a voltage comparison unit, and a signal delay unit, the current detection unit including current sensors and a sample and hold device, the voltage comparison unit including inputs for voltages from the coils, the control means further including an input to which an interrupt request may be applied.

24. The apparatus according to claim 23, wherein the motor includes at least three coils and the control means provides at least three commutation signals.

25. The apparatus according to claim 11, wherein the control means, in determining rotor position, determines a phase of a fundamental oscillation of at least some of the functions, which are repeatedly determined.

26. The apparatus according to claim 7, wherein the brushless electric motor is operated at no load.

27. The apparatus according to claim 13, wherein the brushless electric motor is operated at no load.

28. The apparatus according to claim 20, wherein the control means determines phases and amplitudes of oscillatory functions of the at least some functions by Fourier transform analysis.

29. The apparatus according to claim 17, comprising additional control means that provides a desired rotor position, compares it with the determined rotor position to provide an error signal, and applies the error signal via proportional-integral-derivative negative feedback to reduce the error signal.

* * * * *

UNITED STATES PATENT AND TRADEMARK OFFICE
CERTIFICATE OF CORRECTION

PATENT NO. : 5,280,222
DATED : January 18, 1994
INVENTOR(S) : Von der Heide, et al.

It is certified that error appears in the above-indentified patent and that said Letters Patent is hereby corrected as shown below:

Abstract, line 9, "a" should read --an--.

Title page, column 1, after the assignee's name, the full address should read--St. Georgen, Federal Republic of Germany--.

Claim 22, column 28, line 1, "up" should read--on--.

Signed and Sealed this

Twentieth Day of September, 1994

Attest:

BRUCE LEHMAN

Attesting Officer  Commissioner of Patents and Trademarks